US012475765B2

(12) United States Patent
Tran et al.

(10) Patent No.: US 12,475,765 B2
(45) **Date of Patent: *Nov. 18, 2025**

(54) GAMING DEVICE WITH MULTIPLE TRIGGERABLE RESPIN FEATURES

(71) Applicant: Aristocrat Technologies Australia Pty Limited, North Ryde (AU)

(72) Inventors: Dinh Toan Tran, Wetherill Park (AU); Romit Aggarwal, Kellyville (AU); Nicholas O'Sullivan, Beacon Hill (AU); Alessandro Sidoti, St Ives (AU); Xin Liu, Epping (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 2 days.

This patent is subject to a terminal disclaimer.

(21) Appl. No.: 18/185,890

(22) Filed: Mar. 17, 2023

(65) Prior Publication Data

US 2023/0267799 A1 Aug. 24, 2023

Related U.S. Application Data

(63) Continuation of application No. 17/164,357, filed on Feb. 1, 2021, now Pat. No. 11,625,984.

(30) Foreign Application Priority Data

Feb. 19, 2020 (AU) ................................ 2020900465
Feb. 19, 2020 (AU) ................................ 2020900466

(Continued)

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/3269* (2013.01); *G07F 17/34* (2013.01)

(58) Field of Classification Search
CPC .. G07F 17/34; G07F 17/3213; G07F 17/3267; G07F 17/3258; G07F 17/326;

(Continued)

(56) References Cited

U.S. PATENT DOCUMENTS 6,186,894 B1 2/2001 Mayeroff
9,286,757 B2 3/2016 Guinn (Continued)

FOREIGN PATENT DOCUMENTS

AU 2021204417 9/2021

OTHER PUBLICATIONS

Australian Examination Report No. 1 issued in App. No. AU2021204417, dated May 9, 2022, 8 pages.

(Continued)

*Primary Examiner* — Justin L Myhr
(74) *Attorney, Agent, or Firm* — Blank Rome LLP

(57) ABSTRACT

A gaming device includes a display, a processor, and a memory storing a plurality of sets of reel strips which include configurable and non-configurable symbols. The gaming device provides hold and spin feature games that hold the configurable symbols if selected. Additional game windows can be activated enabling configurable symbols to be added. Only one of multiple versions of the hold and spin feature game may be triggered from any base game depending on which set of reel strips is used, and its respective version of triggering symbols. In one example, a fixed number of multiple game windows are always activated if the hold and spin feature is a first version while only one game window is initially active if the hold and spin feature (Continued)

1600 is a second version. In the second version, more game windows can be activated if sufficient configurable symbols are held.

18 Claims, 23 Drawing Sheets

(30) Foreign Application Priority Data

Sep. 21, 2020 (AU) ................................ 2020239629
Sep. 29, 2020 (AU) ................................ 2020244437

(58) Field of Classification Search
CPC ............. G07F 17/3262; G07F 17/3269; G07F 17/3211; G07F 17/323
See application file for complete search history.

(56) References Cited

U.S. PATENT DOCUMENTS

| | | | | |
|---|---|---|---|---|
| 10,360,753 | B2 | 7/2019 | Shiraishi | |
| 2002/0183105 | A1* | 12/2002 | Cannon | G07F 17/32 463/16 |
| 2005/0075163 | A1 | 4/2005 | Cuddy | |
| 2005/0119043 | A1 | 6/2005 | Berman | |
| 2006/0025201 | A1 | 2/2006 | Van Asdale | |
| 2010/0016055 | A1 | 1/2010 | Englman | |
| 2011/0105218 | A1 | 5/2011 | Anderson | |
| 2012/0172107 | A1* | 7/2012 | Acres | G07F 17/34 463/16 |
| 2013/0072286 | A1 | 3/2013 | Suda | |
| 2013/0337899 | A1 | 12/2013 | Cannon | |
| 2014/0335931 | A1 | 11/2014 | Kemper | |
| 2016/0049050 | A1 | 2/2016 | Berman | |
| 2016/0086431 | A1 | 3/2016 | Berman | |
| 2017/0039802 | A1 | 2/2017 | Prabhu | |
| 2017/0200345 | A1 | 7/2017 | Fujisawa | |
| 2017/0365127 | A1 | 12/2017 | Zoble | |
| 2018/0040202 | A1 | 2/2018 | Meyer | |
| 2018/0122184 | A1 | 5/2018 | Wortmann | |
| 2018/0286183 | A1 | 10/2018 | Davis | |
| 2019/0295377 | A1 | 9/2019 | Suda | |
| 2021/0217276 | A1 | 7/2021 | Sidoti | |
| 2021/0256815 | A1 | 8/2021 | Toan | |

OTHER PUBLICATIONS

Australian Examination Report No. 1 issued in App. No. AU2020239629, dated Aug. 8, 2022, 5 pages.
Office Action (Non-Final Rejection) dated Jan. 28, 2022 for U.S. Appl. No. 17/164,357 (pp. 1-18).
Office Action (Non-Final Rejection) dated Mar. 21, 2022 for U.S. Appl. No. 17/172,948 (pp. 1-22).
Office Action (Final Rejection) dated Jun. 30, 2022 for U.S. Appl. No. 17/164,357 (pp. 1-17).
Office Action (Final Rejection) dated Aug. 25, 2022 for U.S. Appl. No. 17/172,948 (pp. 1-23).
Office Action (Notice of Allowance and Fees Due (PTOL-85)) dated Dec. 21, 2022 for U.S. Appl. No. 17/164,357 (pp. 1-8).
Office Action (Notice of Allowance and Fees Due (PTOL-85)) dated Jan. 13, 2023 for U.S. Appl. No. 17/164,357 (pp. 1-4).
Office Action (Non-Final Rejection) dated Jan. 25, 2023 for U.S. Appl. No. 17/172,948 (pp. 1-20).
Office Action (Notice of Allowance and Fees Due (PTOL-85)) dated Jun. 20, 2023 for U.S. Appl. No. 17/172,948 (pp. 1-8).
Australian Examination Report No. 1 issued in App. No. AU2023202854, dated Feb. 27, 2024, 5 pages.
Office Action (Non-Final Rejection) dated Sep. 9, 2024 for U.S. Appl. No. 18/471,571 (pp. 1-14).
Australian Examination Report No. 1 issued in App. No. AU2023206095, dated May 30, 2024, 5 pages.

* cited by examiner

300

341 342 343 344 345

| | Reel strip position | Reel 1 | Reel 2 | Reel 3 | Reel 4 | Reel 5 |
|---|---|---|---|---|---|---|
| 301 | 1 | Pic 1 | 10 | COR | Q | COR |
| 302 | 2 | SCAT | Q | COR | A | 10 |
| 303 | 3 | COR | K | Pic 1 | 10 | A |
| 304 | 4 | COR | Pic 1 | SCAT | Wild | Wild |
| 305 | 5 | Q | A | Q | Pic 2 | Pic 2 |
| 306 | 6 | 10 | COR | K | J | A |
| 307 | 7 | Q | COR | K | Pic 1 | Q |
| 308 | 8 | Pic 2 | SCAT | Wild | COR | Pic 3 |
| 309 | 9 | A | Pic 1 | 10 | Q | 9 |
| 310 | 10 | 9 | COR | Pic 1 | K | J |
| 311 | 11 | Pic 2 | Pic 5 | 9 | COR | A |
| 312 | 12 | 10 | 9 | Pic 5 | Pic 1 | SCAT |
| 313 | 13 | Pic 1 | K | A | A | K |
| 314 | 14 | Pic 3 | 9 | Q | COR | Pic 4 |
| 315 | 15 | K | Wild | J | Pic 2 | 9 |
| 316 | 16 | K | 10 | COR | 9 | Wild |
| 317 | 17 | J | Wild | COR | A | K |
| 318 | 18 | COR | Pic 2 | Wild | SCAT | Pic 1 |
| 319 | 19 | COR | Q | Pic 2 | 10 | Pic 1 |
| 320 | 20 | Pic 1 | J | J | K | 10 |
| 321 | 21 | Pic 1 | COR | Pic 3 | Pic 3 | K |
| 322 | 22 | J | Pic 1 | Pic 4 | Pic 4 | Pic 2 |
| 323 | 23 | Pic 3 | Pic 1 | K | 10 | Q |
| 324 | 24 | 9 | COR | 10 | J | COR |
| 325 | 25 | Pic 5 | COR | COR | Pic 1 | COR |
| 326 | 26 | A | 4 | 10 | 9 | K |
| 327 | 27 | 10 | Scat | Pic 1 | 10 | Pic 1 |
| 328 | 28 | Pic 4 | K | COR | Wild | 10 |
| 329 | 29 | COR | 10 | J | Q | Pic 2 |
| 330 | 30 | Q | Q | Pic 4 | K | J |

351 352 353

331

FIG. 3

1000

| | Reel strip position (1000) | Reel 1 (1041) | Reel 2 (1042) |
|---|---|---|---|
| 301 | 1 | COR | 10 |
| 302 | 2 | 10 | Q |
| 303 | 3 | J | K |
| 304 | 4 | Pic1 | Pic1 |
| 305 | 5 | Q | A |
| 306 | 6 | 10 | COR |
| 307 | 7 | Q | Pic1 |
| 308 | 8 | Pic 2 | COR |
| 309 | 9 | A | COR |
| 310 | 10 | 9 | Pic1 |
| 311 | 11 | Pic 2 | Pic 5 |
| 312 | 12 | 10 | 9 |
| 313 | 13 | Pic 1 | K |
| 314 | 14 | Pic 3 | 9 |
| 315 | 15 | K | Wild |
| 316 | 16 | K | 10 |
| 317 | 17 | J | Wild |
| 318 | 18 | Pic1 | Pic2 |
| 319 | 19 | A | Q |
| 320 | 20 | K | J |
| 321 | 21 | Pic 1 | Pic1 |
| 322 | 22 | J | COR |
| 323 | 23 | Pic 3 | COR |
| 324 | 24 | 9 | COR |
| 325 | 25 | Pic 5 | Pic1 |
| 326 | 26 | A | 4 |
| 327 | 27 | 10 | Scat |
| 328 | 28 | Pic 4 | K |
| 329 | 29 | 9 | 10 |
| 330 | 30 | Q | Q |

FIG. 10

GAMING DEVICE WITH MULTIPLE TRIGGERABLE RESPIN FEATURES

CROSS-REFERENCE TO RELATED APPLICATIONS

The present application is a continuation of U.S. Pat. No. 11,625,984, issued Apr. 11, 2023, which claims priority to Australian Patent Application Serial No. 2020900465 filed Feb. 19, 2020, Australian Patent Application Serial No. 2020239629 filed Sep. 21, 2020, Australian Patent Application Serial No. 2020900466 filed Feb. 19, 2020, and Australian Patent Application Serial No. 2020244437 filed Sep. 29, 2020, all of which are hereby incorporated by reference in their entireties.

FIELD

The present application relates to a gaming device, a method of operating a gaming device.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Embodiments provide a gaming device, a method of operating a gaming device, and a gaming system which provide hold and spin feature games that use configurable symbols which are held in position if selected. In some embodiments, there may be multiple versions of base game reel strips with different triggering symbols corresponding to different versions of the hold and spin feature game. In various embodiments, additional game windows can be activated enabling configurable symbols to be added.

A described embodiment provides a gaming device comprising a display, a processor, and a memory storing (i) a first set of reel strips, each reel strip of the first set of reel strips comprising configurable symbols and non-configurable symbols, (ii) a second set of reel strips each comprising non-configurable symbols and at least one configurable symbol, and (iii) instructions. When executed by the processor, the instructions cause the processor to assign, in each game instance, a prize to at least each configurable symbol selected for display. The instructions cause the processor to initiate a plurality of feature game instances responsive to a feature trigger condition being met in a base game instance. The feature trigger condition includes selection of a defined minimum of configurable symbols and the configurable symbols that met the feature trigger condition are held in their respective positions from the base game instance in a first game window. The instructions cause the processor to conduct each feature game instance by determining whether an activation condition is met. The first activation condition includes reaching a first threshold number of configurable symbols in an active game window. The instructions further cause the processor to conduct each feature game instance by responsive to the first activation condition being met, activating another game window comprising a plurality of columns of symbol positions. The instructions further cause the processor to conduct each feature game instance by randomly selecting, using a random number generator, a symbol for each symbol position of each active window not occupied by a held configurable symbol from a reel strip of the plurality of second reel strips assigned to the respective symbol position, and holding any configurable symbols in place for each subsequent feature game instance. The instructions cause the processor to perform a pay evaluation at the conclusion of the feature game instances, at least a total of the prizes assigned to configurable symbols in each active game window.

Another described embodiment provides a method of operating a gaming device comprising a display and a memory storing (i) a first set of reel strips, each reel strip of the first set of reel strips comprising configurable symbols and non-configurable symbols, and (ii) a second set of reel strips each comprising non-configurable symbols and at least one configurable symbol. The method comprises assigning, in each game instance, a prize to at least each configurable symbol selected for display. The method comprises conducting a base game instance by controlling the display to display a first game window comprising a plurality of columns of symbol positions, wherein each reel strip of the first set of reel strips corresponds to a respective one of the plurality of columns of symbol positions, selecting a plurality of symbols from each of the first set of reel strips, controlling the display to display the selected symbols in the plurality of columns of symbol positions, evaluating the selected symbols for winning combinations, and evaluating the selected symbols to determine whether a feature trigger condition is met, wherein the feature trigger condition comprises selection of a defined minimum number of configurable symbols among the selected symbols. The method comprises initiating, responsive to the feature trigger condition being met, a plurality of feature game instances, wherein when the plurality of feature game instances are initiated, at least the first game window is active and the configurable symbols that met the feature trigger condition are held in their respective positions from the base game instance in the first game window. The method comprises conducting each feature game instance by determining whether an activation condition is met, responsive to an activation condition being met, activating another game window comprising another plurality of columns of symbol positions for each subsequent feature game instance selecting a symbol for each symbol position of each active window not occupied by a held configurable symbol from a reel strip of the plurality of second reel strips assigned to the respective symbol position, and holding any configurable symbols in place for each subsequent feature game instance. The method comprises awarding, at the conclusion of the feature game instances, at least a total of the prizes assigned to configurable symbols in each active game window.

Another described embodiment provides a system comprising one or more processors, and at least one memory storing (i) a first set of reel strips, each reel strip of the first set of reel strips comprising configurable symbols and non-configurable symbols, (ii) a second set of reel strips each comprising non-configurable symbols and at least one configurable symbol, and (iii) instructions which. When executed by the one or more processors, the instructions cause the one or more processors to assign, in each game instance, a prize to at least each configurable symbol selected for display. The instructions cause the one or more processors to conduct a base game instance by controlling a display to display a first game window comprising a plurality of columns of symbol positions, wherein each reel strip of the first set of reel strips corresponds to a respective one of the plurality of columns of symbol positions, selecting a plurality of symbols from each of the first set of reel strips, controlling the display to display the selected symbols in the plurality of columns of symbol positions, evaluating the selected symbols for winning combinations, and evaluating the selected symbols to determine whether a feature trigger condition is met, wherein the feature trigger condition comprises selection of a defined minimum number of configurable symbols among the selected symbols. The instructions cause the one or more processors to initiate, responsive to the feature trigger condition being met, a plurality of feature game instances, wherein when the plurality of feature game instances are initiated, at least the first game window is active and the configurable symbols that met the feature trigger condition are held in their respective positions from the base game instance in the first game window. The instructions cause the one or more processors to conduct each feature game instance by determining whether an activation condition is met, responsive to an activation condition being met, activating another game window comprising another plurality of columns of symbol positions, selecting a symbol for each symbol position of each active window not occupied by a held configurable symbol from a reel strip of the plurality of second reel strips assigned to the respective symbol position, and holding any configurable symbols in place for each subsequent feature game instance. The instructions cause the one or more processors to award, at the conclusion of the feature game instances, at least a total of the prizes assigned to configurable symbols in each active game window.

Another described embodiment provides a gaming device comprising a display, a processor, and a memory storing (i) a first set of reel strips, each reel strip of the first set of reel strips comprising configurable symbols and non-configurable symbols, (ii) a second set of reel strips each comprising non-configurable symbols and at least one configurable symbol, and (iii) instructions. When executed by the processor, the instructions cause the processor to assign, in each game instance, a prize to at least each configurable symbol selected for display. The instructions cause the processor to conduct a base game instance by controlling the display to display a first game window comprising a plurality of columns of symbol positions, wherein each reel strip of the first set of reel strips corresponds to a respective one of the plurality of columns of symbol positions, selecting a plurality of symbols from each of the first set of reel strips, controlling the display to display the selected symbols in the plurality of columns of symbol positions, evaluating the selected symbols for winning combinations, and evaluating the selected symbols to determine whether a feature trigger condition is met, wherein the feature trigger condition comprises selection of a defined minimum number of configurable symbols among the selected symbols. The instructions cause the processor to initiate, responsive to the feature trigger condition being met, a plurality of feature game instances, wherein when the plurality of feature game instances are initiated, a plurality of game windows are active and the configurable symbols that met the feature trigger condition in respect of the first game window are displayed in each active game window at symbol positions corresponding to the symbol positions at which the triggering configurable symbols were displayed in the base game instance. The instructions cause the processor to conduct each feature game instance by selecting a symbol, for each symbol position of each active window not occupied by a held configurable symbol, from a reel strip of the plurality of second reel strips assigned to the respective symbol position, holding any configurable symbols in place for each subsequent feature game instance, and award, at the conclusion of the feature game instances, at least a total of the prizes assigned to configurable symbols in each active game window.

Another described embodiment provides a method of operating a gaming device comprising a display, and a memory storing (i) a first set of reel strips, each reel strip of the first set of reel strips includes configurable symbols and non-configurable symbols, and (ii) a second set of reel strips each including non-configurable symbols and at least one configurable symbol. The method comprises assigning, in each game instance, a prize to at least each configurable symbol selected for display. The method comprises initiating, based on a feature trigger condition being met, a plurality of feature game instances. The feature trigger condition is a defined minimum of configurable symbols selected in a first game window of a base game instance. When the plurality of feature game instances are initiated, at least the first game window is active and the configurable symbols that met the feature trigger condition are held in the same positions in the first game window. The method includes conducting each feature game instance by determining whether an activation condition is met. The activation condition includes reaching a threshold number of configurable symbols in an active game window. The method further includes conducting each feature game instance by activating an additional game window based on the activation condition being met. The additional game window comprises a plurality of columns of symbol positions for each subsequent feature game instance. The method further includes conducting each feature game instance by randomly selecting, using a random number generator, a symbol for each symbol position of each active window not occupied by a held configurable symbol. The symbol for each symbol position is selected from a reel strip of the plurality of second reel strips assigned to the respective symbol position. The method further comprises conducting each feature game instance by holding configurable symbols in place for each subsequent feature game instance. The method additionally includes performing a pay evaluation of an outcome of the plurality of feature game instances based on at least the prizes assigned to configurable symbols selected for display in each active game window.

Another described embodiment provides a system comprising one or more processors, and at least one memory storing (i) a first set of reel strips, each reel strip of the first set of reel strips comprising configurable symbols and non-configurable symbols, (ii) a second set of reel strips each comprising non-configurable symbols and at least one configurable symbol, and (iii) instructions. When executed by the one or more processors, the instructions cause the one or more processors to assign, in each game instance, a prize to at least each configurable symbol selected for display. The instructions cause the one or more processors to conduct a base game instance by controlling a display to display a first game window comprising a plurality of columns of symbol positions, wherein each reel strip of the first set of reel strips corresponds to a respective one of the plurality of columns of symbol positions, selecting a plurality of symbols from each of the first set of reel strips, controlling the display to display the selected symbols in the plurality of columns of symbol positions, evaluating the selected symbols for winning combinations, and evaluating the selected symbols to determine whether a feature trigger condition is met, wherein the feature trigger condition comprises selection of a defined minimum number of configurable symbols among the selected symbols. The instructions cause the one or more processors to initiate, responsive to the feature trigger condition being met, a plurality of feature game instances, wherein when the plurality of feature game instances are initiated, a plurality of game windows are active and the configurable symbols that met the feature trigger condition in respect of the first game window are displayed in each active game window at symbol positions corresponding to the symbol positions at which the triggering configurable symbols were displayed in the base game instance. The instructions cause the one or more processors to conduct each feature game instance by selecting a symbol, for each symbol position of each active window not occupied by a held configurable symbol, from a reel strip of the plurality of second reel strips assigned to the respective symbol position, and holding any configurable symbols in place for each subsequent feature game instance. The instructions cause the one or more processors to award, at the conclusion of the feature game instances, at least a total of the prizes assigned to configurable symbols in each active game window.

Another described embodiment provides a non-transitory computer-readable medium, readable by at least one processor and comprising instructions stored thereon to cause the at least one processor to access (i) a first set of reel strips, each reel strip of the first set of reel strips comprising configurable symbols and non-configurable symbols, and (ii) a second set of reel strips each comprising non-configurable symbols and at least one configurable symbol. The instructions further cause the processor to assign a prize to at least each configurable symbol selected for display in each game instance. The instructions further cause the processor to determine that a rigger condition is met in a base game instance, wherein the trigger condition comprises selection of a predefined minimum of configurable symbols in a first game window. The instructions further cause the processor to initiate a plurality of game instances, wherein when the plurality of game instances are initiated, a plurality of game windows are active and the configurable symbols that met the trigger condition in the first game window are displayed in each active game window at symbol positions corresponding to the symbol positions at which the triggering configurable symbols were displayed in the base game instance. The instructions further cause the processor to conduct at least one subsequent game instance by: randomly selecting a symbol, using a random number generator, for each symbol position of each active window not occupied by a held configurable symbol, wherein each symbol is selected from a reel strip of the plurality of second reel strips assigned to the respective symbol position, and holding any configurable symbols in place for each subsequent game instance. The instructions further cause the processor to perform a pay evaluation based on prizes assigned to configurable symbols in each active game window.

BRIEF DESCRIPTION OF THE DRAWINGS

FIG. 3 illustrates an example reel strip layout.

FIG. 10 illustrates example reel strip layouts.

DETAILED DESCRIPTION

The present disclosure is generally directed to providing hold and spin feature games that use configurable symbols (e.g., cash on reel symbols having prize values) that are held in position if selected. In various examples, additional game windows can be activated enabling configurable symbols to be added. One example includes two versions of the hold and spin feature game, but only one of the two versions may be triggered from any base game. In such an example the gaming device selects (e.g., using an RNG) between variants of base game reel strips which differ based on the triggering symbols for the respective versions of the feature games. In at least one example, a fixed number of game windows are always activated (e.g., four game windows) if the hold and spin feature is a first version while only one game window is initially active if the hold and spin feature is a second version. In the second version, more game windows can be activated if sufficient configurable symbols are held. Thus, a new variable is introduced in how the hold and spin game will be conducted (for example a fixed number of multiple screens vs a variable number of screens), as well as in how additional screens are activated for the version that has a variable number of screens.

In terms of technical effects, the EGMs and functionality described throughout the disclosure deliver improvements to electronic gaming software, UI design, and/or gaming devices by providing new and/or improved gaming device operations that comply with gaming regulations. The gaming device is specially programmed to present and implement new game mechanics that provide another approach to building equity in a game and improved gaming device operations that comply with gaming regulations. For example, the present disclosure includes randomly selecting from variants of base reel strips that trigger different hold and spin games and in some examples establishes a new variable after trigger of the hold and spin game to determine whether additional windows will be activated based on held configurable symbols. In many examples the new variables will be resolved by an RNG result. These variations provide a new way to build equity in a game based on different feature game variants being triggered, the ability to unlock additional game windows, and by holding the configurable symbols. The new EGM gaming functionality adds variability to the game play, provides new approaches to building equity in the game, and at the same time can be implemented to control gaming machine operation in a manner to comply with regulatory requirements and maintain a desired RTP.

Figure 1:
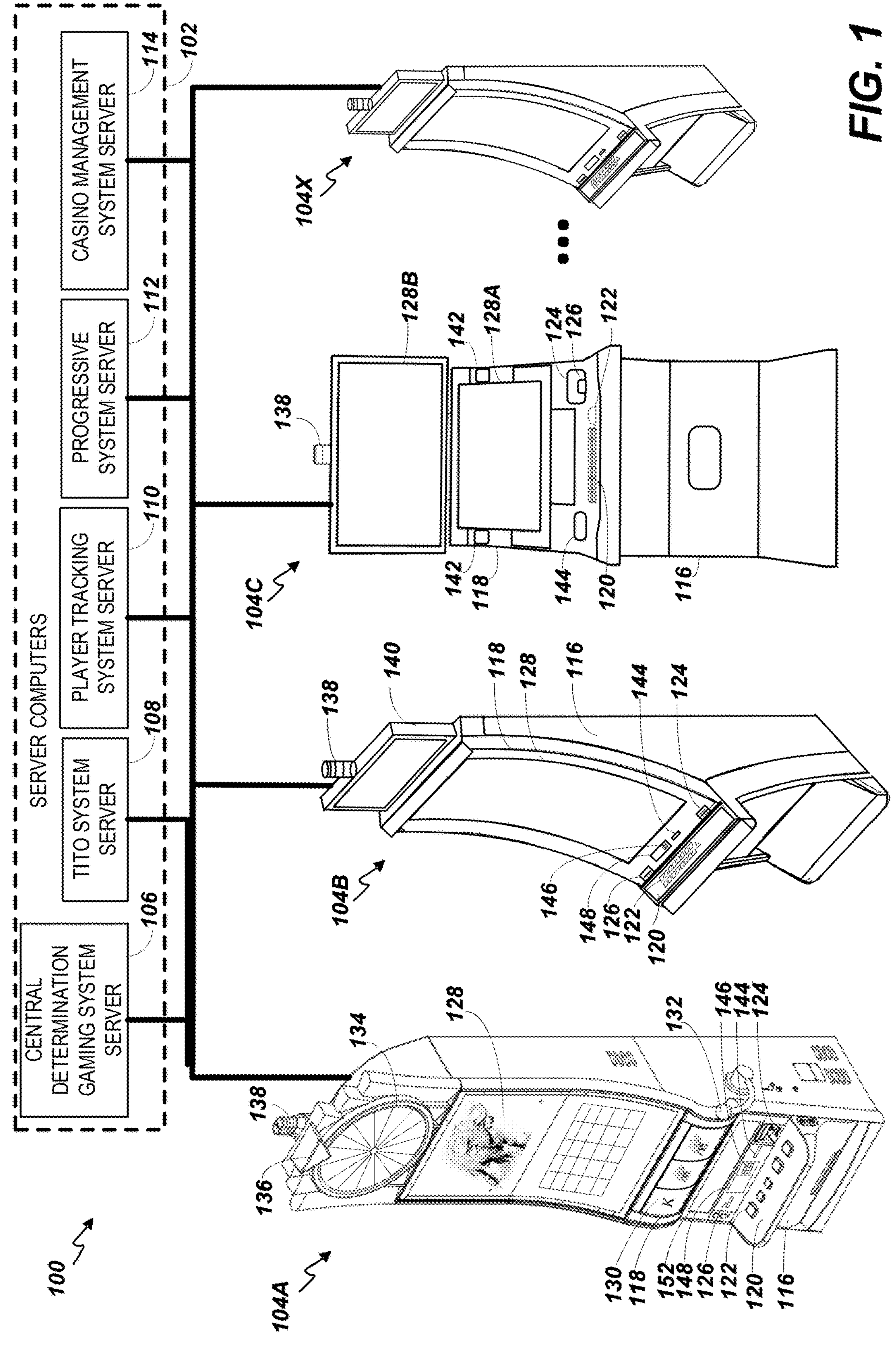
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket—in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
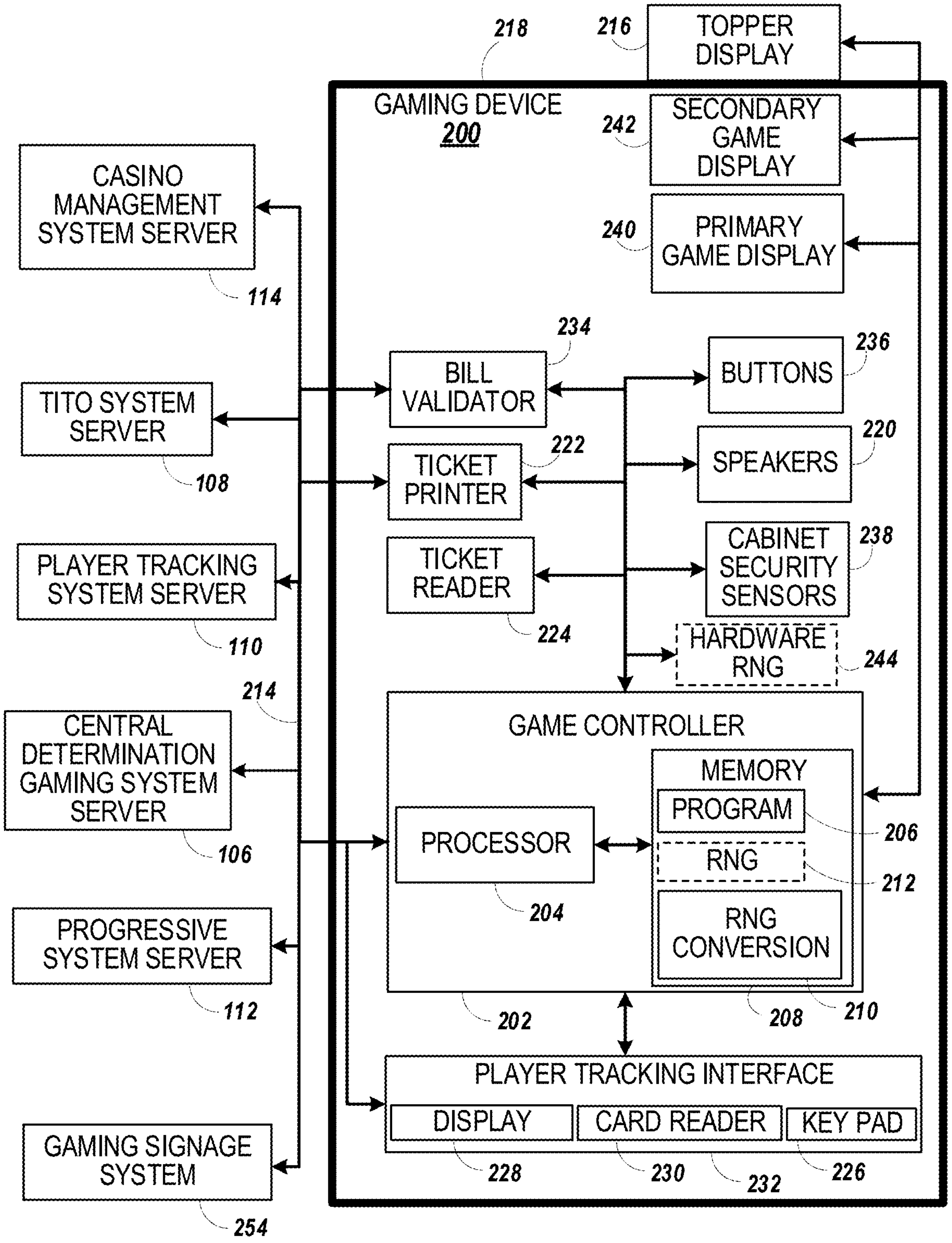
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term “game instance” refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a “random number”).

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility. A weighted table is one type of lookup table and the two terms can be used interchangeably throughout the present disclosure.

The lookup tables, in the form of weighted tables, can have one of many possible configurations. In general, a weighted table can be implemented as any data structure that assigns probabilities to different options, in order for one of the different options to be selected using a random number. Different options are represented in different entries of a weighted table. For example, there may be multiple possible values within each tier of the weighted table, and the multiple possible values may be unequally weighted. The probabilities for different options can be reflected in threshold values (e.g., for a random number RND, generated by an RNG, in the range of 1<RND<=40 for option 1, 40<RND<=70 for option 2, 70<RND<=90 for option 3, and 90<RND<=100 for option 4, given four options and a random number RND where 0<RND<=100). The threshold values can represent percentages or, more generally, subranges within the range for a random number. In some example implementations, the threshold values for a weighted table are represented as count values for the respective entries of the weighted table. For example, the following table shows count values for the four options described above:

TABLE 1

Example Weighted Table

| count value | entry |
|---|---|
| 40 | <value a1, value a2, . . . > |
| 30 | <value b1, value b2, . . . > |
| 20 | <value c1, value c2, . . . > |
| 10 | <value d1, value d2, . . . > |

The sum total of the count values indicates the range of the options. Control logic can use a random number, generated between 1 and the sum total of the count values, to select one of the entries in the weighted table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected.

The threshold values for a weighted table can be fixed and predetermined. Or, the threshold values for a weighted table can vary dynamically (e.g., depending on bet level). Or, a weighted table can be dynamically selected (e.g., depending on bet level) from among multiple available weighted tables. Different parameters or choices during game play can use different weighted tables. Or, different combinations of parameters or choices can be combined in entries of a given weighted table.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
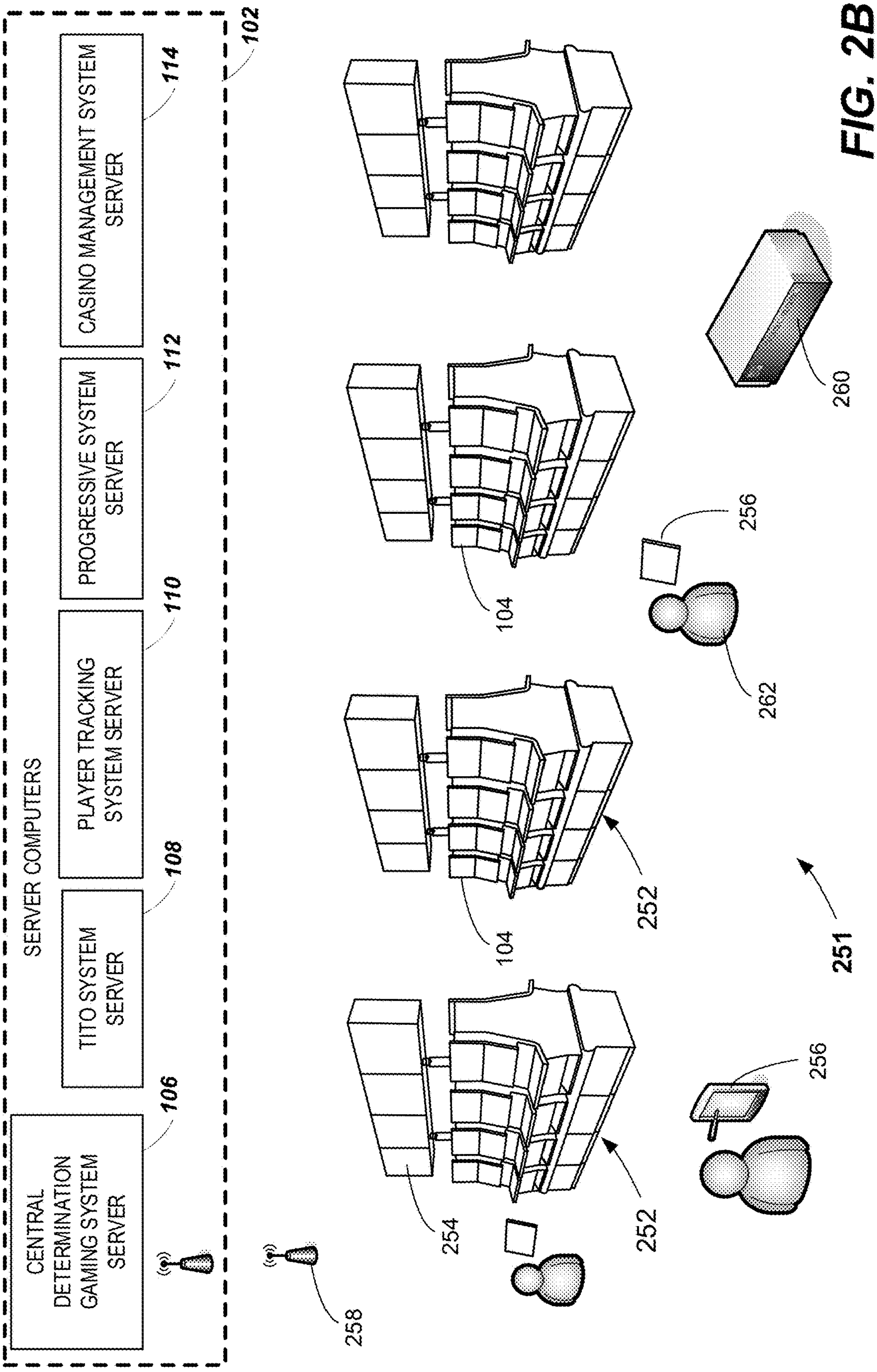
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
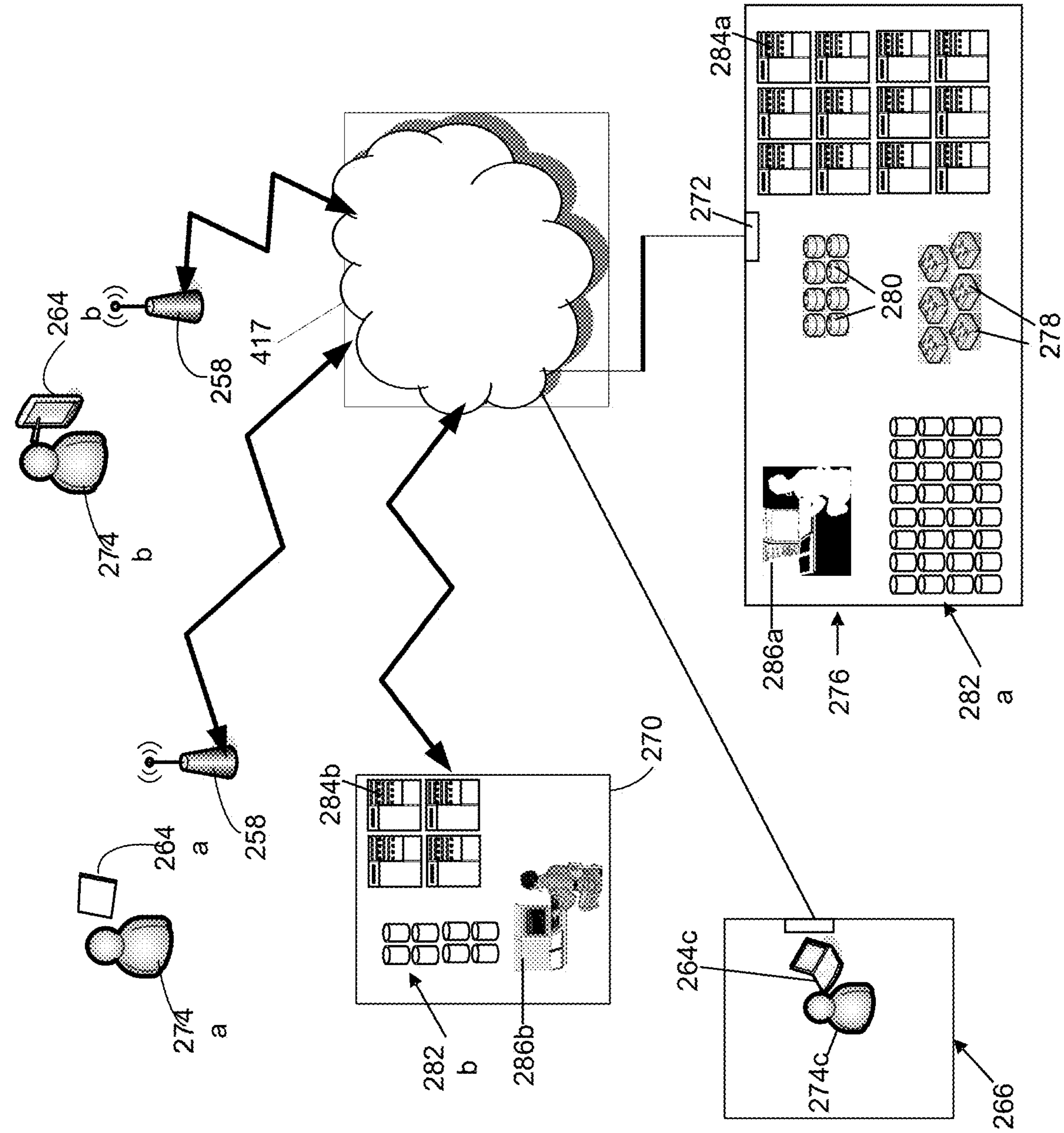
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 2D:
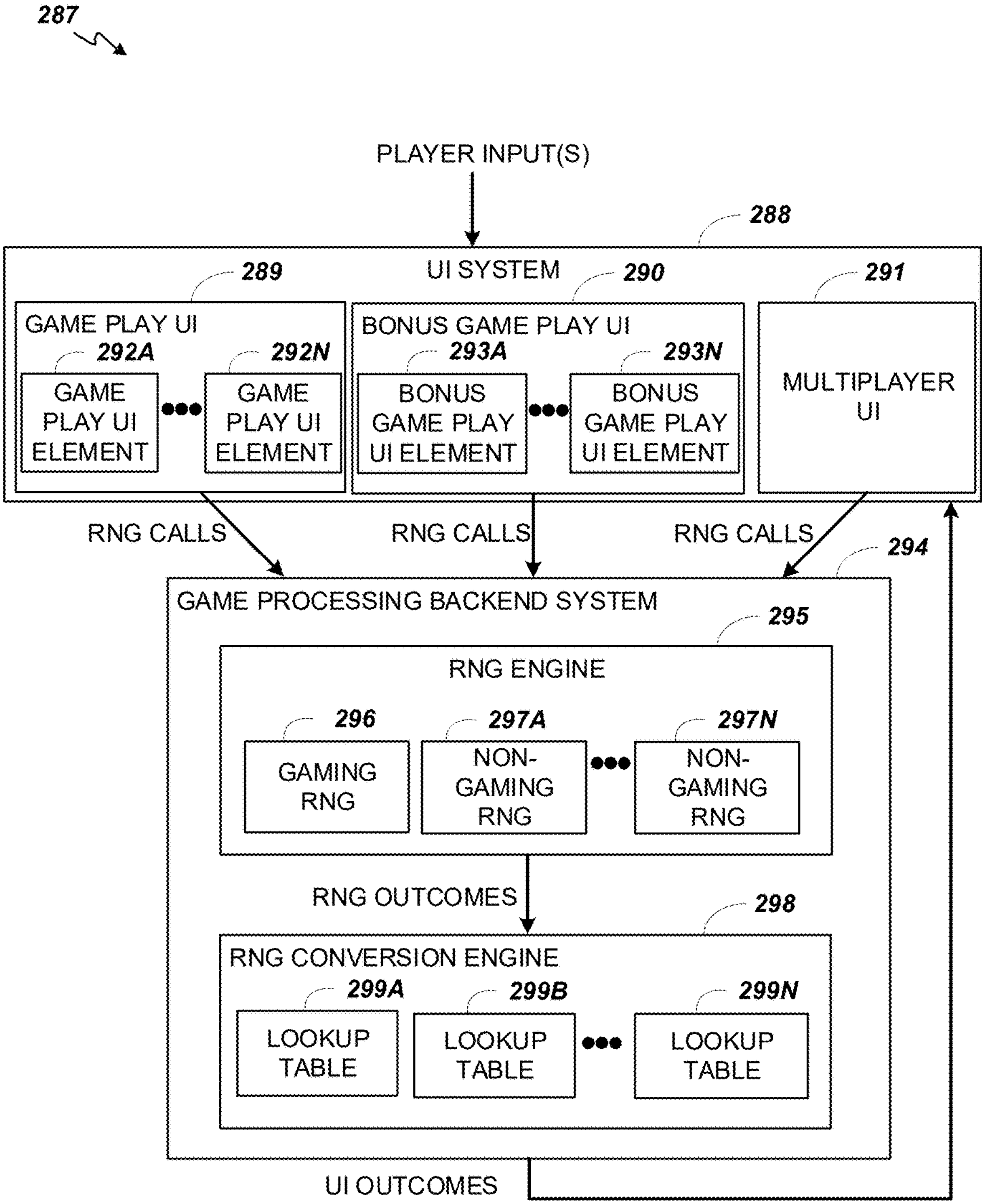
FIG. 2D illustrates, in block diagram form, an implementation of a game processing architecture algorithm that implements a game processing pipeline for the play of a game in accordance with various implementations described herein.

FIG. 2D illustrates, in block diagram form, an implementation of a game processing architecture 287 that implements a game processing pipeline for the play of a game in accordance with various implementations described herein. As shown in FIG. 2D, the gaming processing pipeline starts with having a UI system 288 receive one or more player inputs for the game instance. Based on the player input(s), the UI system 288 generates and sends one or more RNG calls to a game processing backend system 294. Game processing backend system 294 then processes the RNG calls with RNG engine 295 to generate one or more RNG outcomes. The RNG outcomes are then sent to the RNG conversion engine 298 to generate one or more game outcomes for the UI system 288 to display to a player. The game processing architecture 287 can implement the game processing pipeline using a gaming device, such as gaming devices 104A-104X and 200 shown in FIGS. 1 and 2, respectively. Alternatively, portions of the gaming processing architecture 287 can implement the game processing pipeline using a gaming device and one or more remote gaming devices, such as central determination gaming system server 106 shown in FIG. 1.

The UI system 288 includes one or more UIs that a player can interact with. The UI system 288 could include one or more game play UIs 289, one or more bonus game play UIs 290, and one or more multiplayer UIs 291, where each UI type includes one or more mechanical UIs and/or graphical UIs (GUIs). In other words, game play UI 289, bonus game play UI 290, and the multiplayer UI 291 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 2D as an example, the different UI elements are shown as game play UI elements 292A-292N and bonus game play UI elements 293A-293N.

The game play UI 289 represents a UI that a player typically interfaces with for a base game. During a game instance of a base game, the game play UI elements 292A-292N (e.g., GUI elements depicting one or more virtual reels) are shown and/or made available to a user. In a subsequent game instance, the UI system 288 could transition out of the base game to one or more bonus games. The bonus game play UI 290 represents a UI that utilizes bonus game play UI elements 293A-293N for a player to interact with and/or view during a bonus game. In one or more implementations, at least some of the game play UI element 292A-292N are similar to the bonus game play UI elements 293A-293N. In other implementations, the game play UI element 291A-292N can differ from the bonus game play UI elements 293A-293N.

FIG. 2D also illustrates that UI system 289 could include a multiplayer UI 291 purposed for game play that differs or is separate from the typical base game. For example, multiplayer UI 291 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 295 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 2D does not explicitly depict that multiplayer UI 294 includes UI elements, multiplayer UI 291 could also include one or more multiplayer UI elements.

Based on the player inputs, the UI system 288 could generate RNG calls to a game processing backend system 294. As an example, the UI system 288 could use one or more application programming interfaces (APIs) to generate the RNG calls. To process the RNG calls, the RNG engine 295 could utilize gaming RNG 296 and/or non-gaming RNGs 297A-297N. Gaming RNG 296 could corresponds to RNG 212 or hardware RNG 244 shown in FIG. 2A. As previously discussed with reference to FIG. 2A, gaming RNG 296 often performs specialized and non-generic operations that comply with regulatory and/or game requirements. For example, because of regulation requirements, gaming RNG 296 could correspond to RNG 212 by being a cryptographic RNG or pseudorandom number generator (PRNG) (e.g., Fortuna PRNG) that securely produces random numbers for one or more game features. To securely generate random numbers, gaming RNG 296 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 298 processes each RNG outcome from RNG engine 295 and converts the RNG outcome to a UI outcome that is feedback to the UI system 288. With reference to FIG. 2A, RNG conversion engine 298 corresponds to RNG conversion engine 210 used for game play. As previously described, RNG conversion engine 298 translates the RNG outcome from the RNG 212 to a game outcome presented to a player. RNG conversion engine 298 utilizes one or more lookup tables 299A-299N to regulate a prize payout amount for each RNG outcome and how often the gaming device pays out the derived prize payout amounts. In one example, the RNG conversion engine 298 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 294 sends the UI outcome to the UI system 288. Examples of UI outcomes are symbols to display on a video reel or reel stops for a mechanical reel. In one example, if the UI outcome is for a base game, the UI system 288 updates one or more game play UI elements 292A-292N, such as symbols, for the game play UI 289. In another example, if the UI outcome is for a bonus game, the UI system could update one or more bonus game play UI elements 293A-293N (e.g., symbols) for the bonus game play UI 290. In response to updating the appropriate UI, the player may subsequently provide additional player inputs to initiate a subsequent game instance that progresses through the game processing pipeline.

Figure 4:
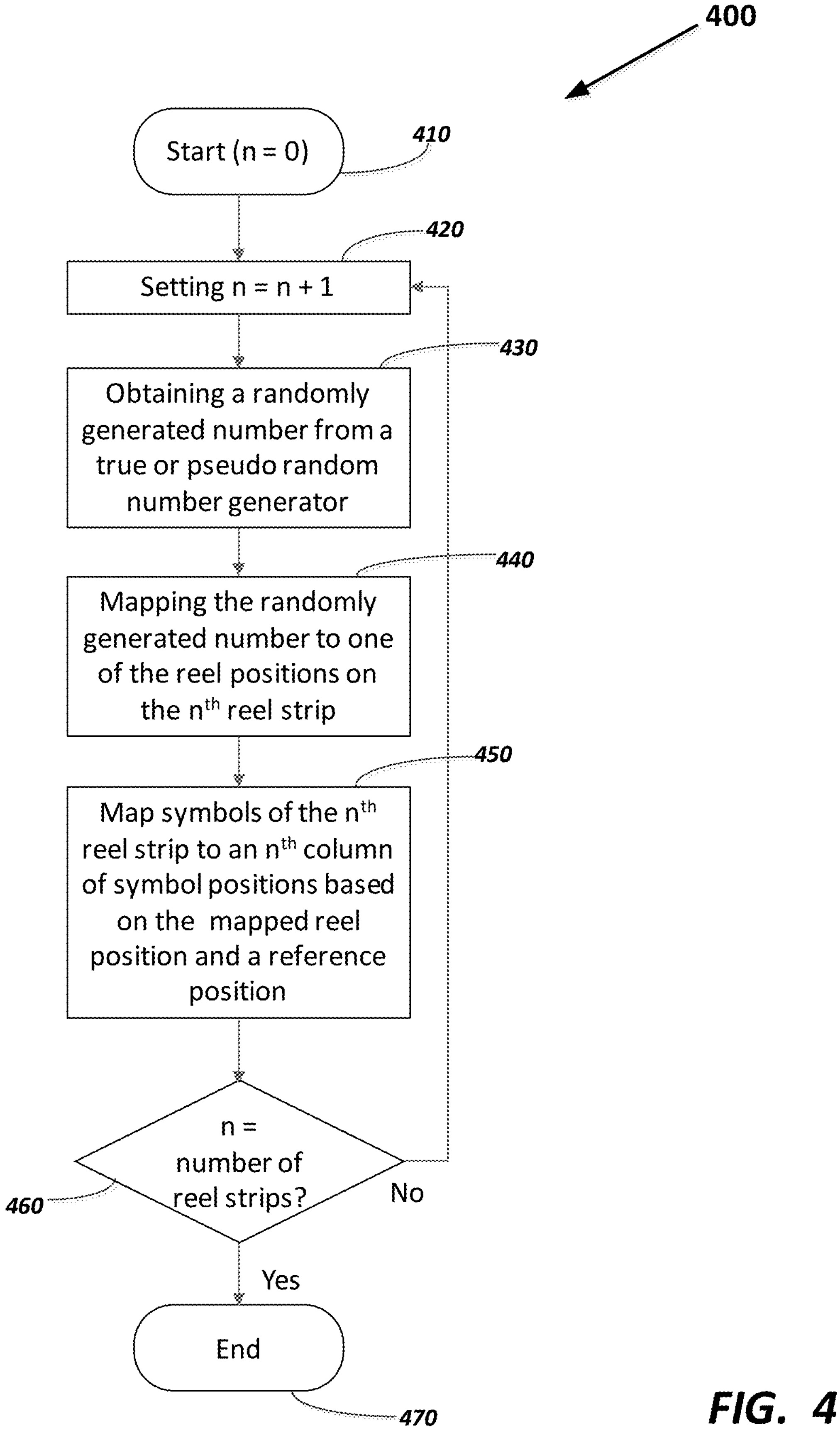
FIG. 4 is a flow chart of a symbol selection method.
Figure 5:
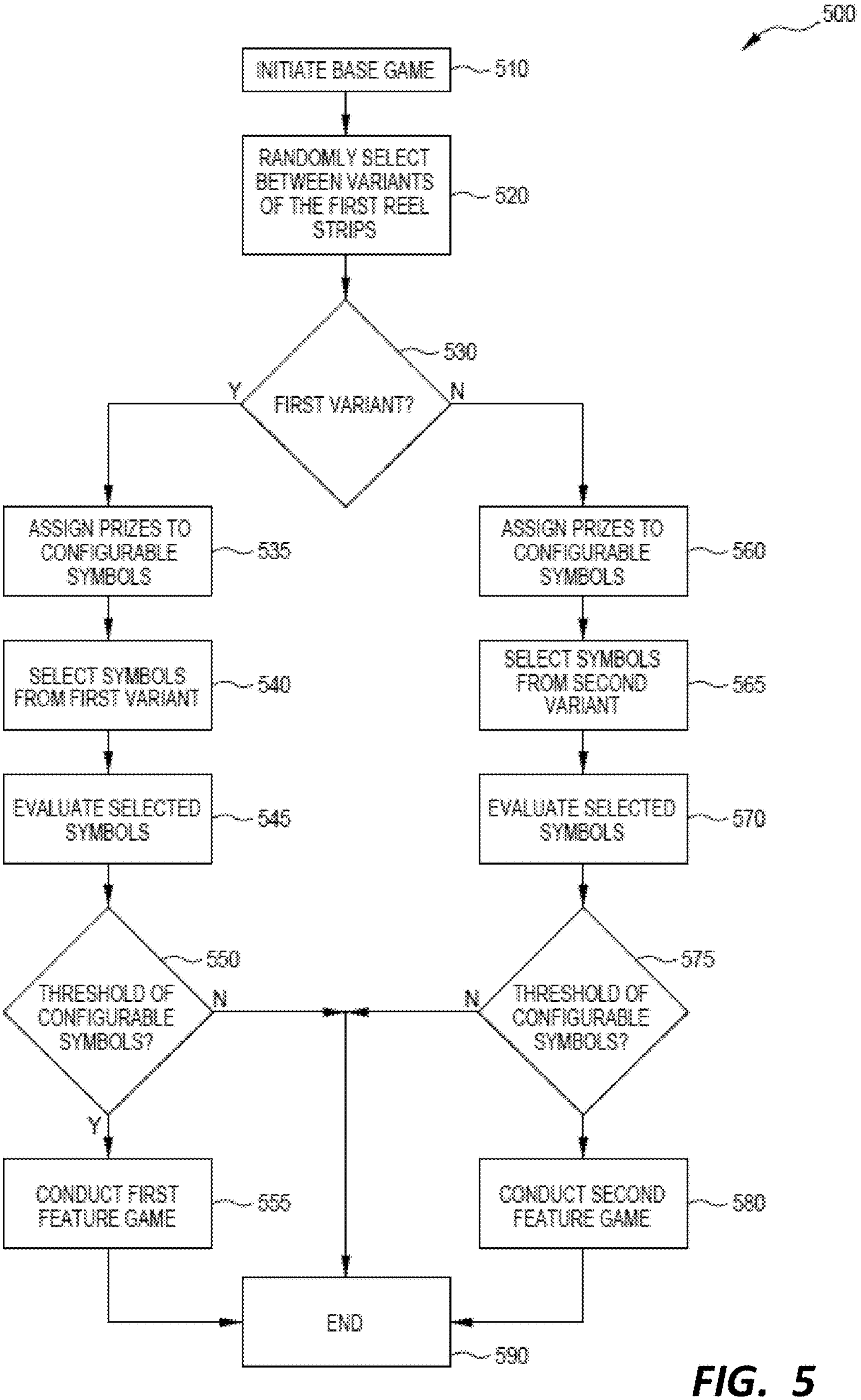
FIG. 5 is a flow chart of a method of operating a gaming device.

FIG. 5 is a flowchart of a method 500 of operating a gaming device to implement a game in a manner that enables two different, but related, feature games to be triggered using a common trigger mechanism. The below-described operations of method 500 carried out by a processor (in the present examples processor 204) can be implemented in response to software stored in memory 208 which includes instructions that when executed result in the described operations (as well as the described operations of example methods 400, 555, 580, 625/725, 630/730, and 1400 of FIGS. 4, 6, 7, 8, 9, and 19, respectively). At step 510, the processor 204 initiates conduct of an instance of a base game, for example, in response to receipt of an instruction to play the game via a button.

At step 520, the processor 204 (FIG. 2A) selects between two different variants of a first set of reel strips. In this example, the variants only differ in the color of certain symbols of the first set of reel strips.

FIG. 3 illustrates an example of a first set 300 of five reel strips 341, 342, 343, 344, 345 of a plurality of reel strips stored in a reel strip data structure in memory 208. In the example, each reel strip has thirty reel strip positions 301-330. Each reel strip position of each reel has a symbol. For example, a "Wild" symbol 331 occupies the twenty-eighth reel strip position 328 of the fourth reel 344. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual lengths of the game reel strips depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Each of the reel strips 343-345 have configurable symbols—i.e. the "COR" symbols. COR stands for "Cash on Reels" as in this example each configurable symbol is configured with a prize value by processor 204 when the symbols are selected as described below.

Figure 11:
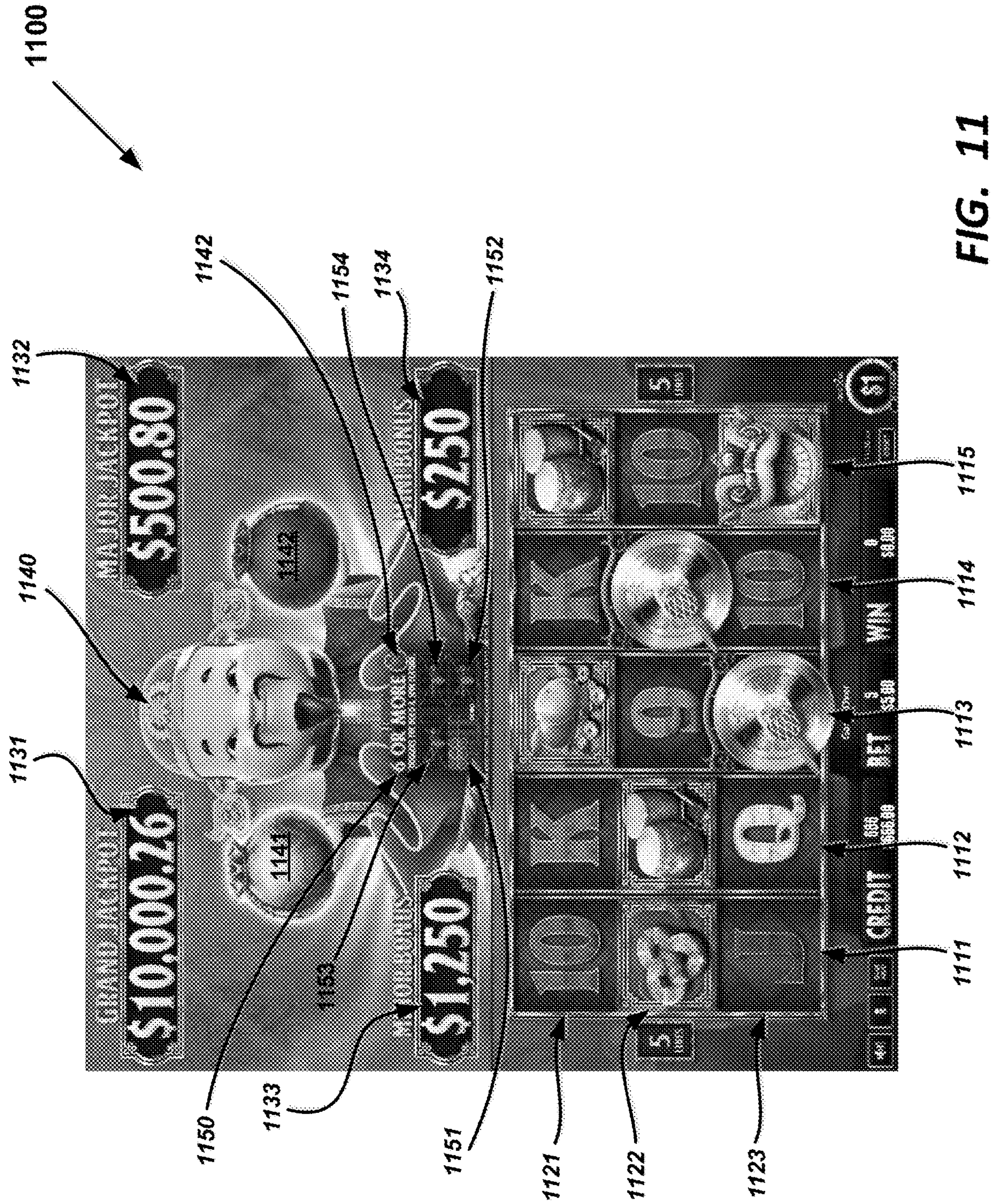
FIGS. 11 to 18 are example screen displays.

In this example, at step 520, processor 204 randomly selects between two variants of the reel strips, where a background or fixed component of each cash on reel symbol is represented by a gold bag 1141 (FIG. 11) and a version where a background or fixed component of each cash on reel symbol is represented by a red bag 1142 (FIG. 11). That is, a single common logical reel strip 300 is used and the "selection" involves configuring the graphical presentation of the reel strip (which may involve loading different graphical assets from memory). In other examples, there may be two different sets of reel strips, for example, with different numbers or distributions of cash on reel symbols. In order to select between the variants, the processor 204 obtains a value from random number generator 212 and compares it to ranges of values assigned to the two variants in memory 208.

In this example, the variant which is selected effects which feature game becomes available to be triggered from the base game. In this respect, referring to FIG. 11, there is shown an example screen display 1100 prior to spinning of the reels, where the reel strips have been configured with the red bag configurable symbol 1142 which in this example is the second variant of the first reel strips. In this respect screen display includes fifteen symbol positions arranged in five columns 1111-1115 of three symbol positions—i.e. in an array with three rows 1121-1123. A top portion of the screen display 1100 shows two progressive jackpot values; a grand jackpot 1131 and a major jackpot 1132. The top portion of the screen display 1100 shows two bonus prize values, a minor bonus 1133 and a mini bonus 1134. A character 1140 holds a gold bag symbol 1141 and a red bag symbol 1142. A triggerable feature message 1150 indicates that "6 or more "red bag symbols" triggers the hold & spin feature". The triggerable feature game message also includes four game windows 1151-1154 with crosses through windows 1152-1154 to indicate that only game window 1151 is guaranteed to be active when 6 or more red bag symbols are selected in a game instance.

Figure 12:
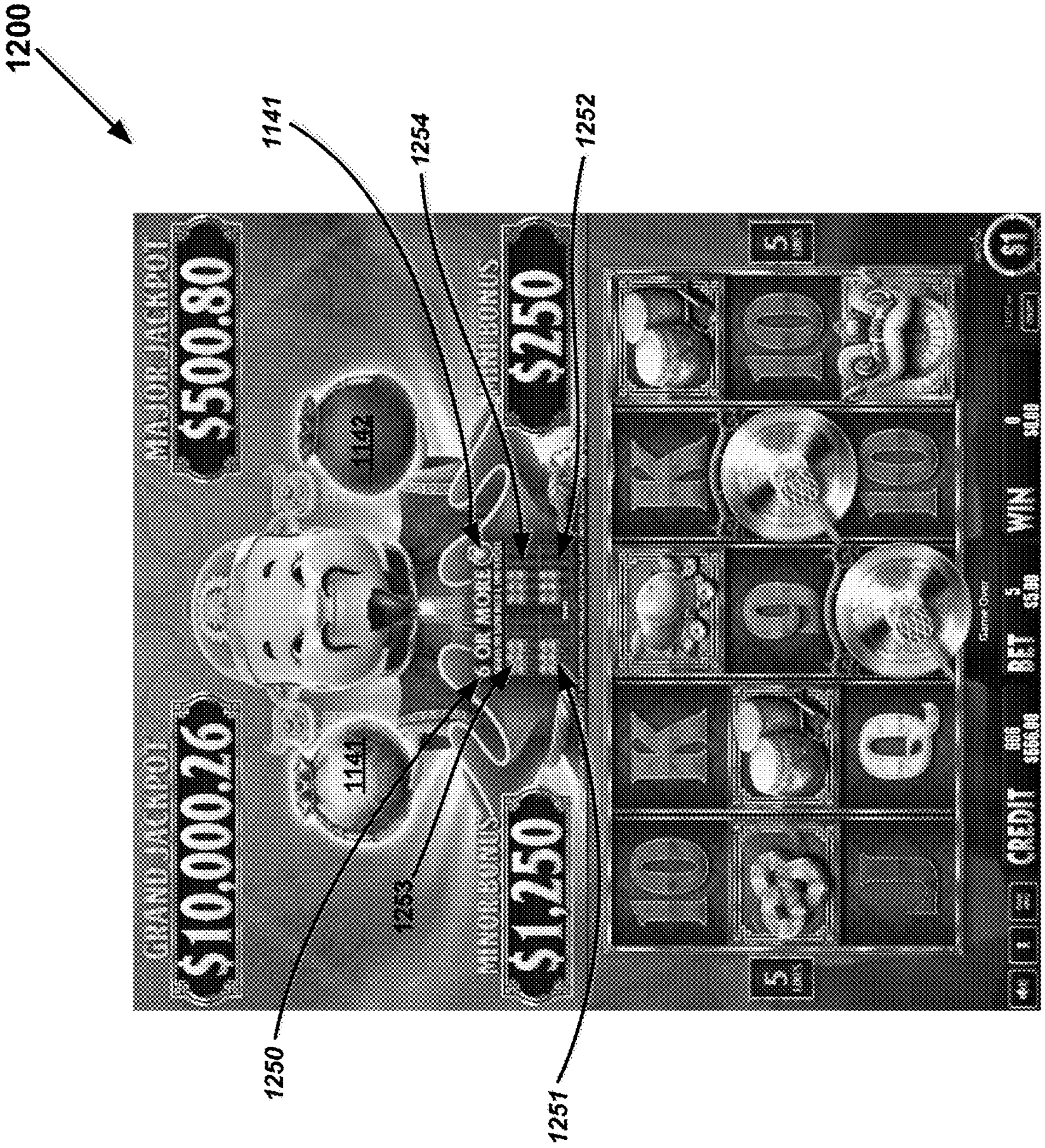

FIG. 12, there is shown an example screen display 1200 prior to spinning of the reels, where the reel strips have been configured with the gold bag configurable symbol 1141 which, in this example, is the first variation of the first reel strips. FIG. 12 shows an alternative triggerable feature message 1250 which indicates that "6 or more "gold bag symbols" triggers the hold & spin feature". The triggerable feature game message also includes four game windows 1251-1254, however unlike windows 1152-1154 there are no crosses which indicate that each of game windows 1251-1254 will be active when 6 or more gold bag symbols are selected in a game instance. Small gold bag symbols (unlabeled) indicate that when the feature game triggers, the triggering symbols will be duplicated to each active window as explained in more detail below in connection with FIGS. 6 and 18.

As indicated by step 530, processor 204 proceeds down one of two processing paths depending on whether the reel strips are configured with the first or the second variant of the reel strips.

In the case where the first variant is employed, at step 535, the processor 204 assigns assignable prizes to each configurable symbol of each of the reel strips. In this example, this enables the prizes to be seen during at least part of the virtual spinning of the reel strips. In an example, a symbol configuring data structure in memory 208 stores a plurality of weighted tables each comprising a plurality of assignable prizes—i.e. prizes that can be assigned to individual cash on reel symbols. In an example, there are separate weighted prize tables for each of reel strips. In an example, each weighted table incorporates a plurality of assignable prizes and different weightings are assigned to each prize in order to control their relative probability of being selected.

In an example, the values of the assignable prizes depend on an amount wagered, for example they correspond to a base amount multiplied by a bet multiplier. In an example, the assignable prizes may be cash amounts (e.g. $5, $10, $20, $25) or otherwise defined prizes such as bonus or jackpot prizes. In other examples, the prizes may be credit amounts, e.g. 100, 200, or 400 credits The instructions in memory 208 cause processor 204 to conduct an iterative loop starting in which the processor 204 randomly selects one of the prizes using a value obtained from random number generator and assigns it to the next configurable symbol in reel strip order until all configurable symbols of a reel strip have been assigned a prize. Processor 204 then iterates to the next reel strip and conducts another iterative loop using the weighted table associated with that strip until all reel strips are configured.

In an alternative example, prizes are randomly selected by the processor 204 from a table of prizes without replacement to enable control of the number of instances of one or more prizes.

At step 540, the processor selects symbols from the first variant of the reel strips. FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. Referring to the example reel strips of FIG. 3, if the value returned by the RNG 212 is mapped to reel position 313, then for the first reel strip 321, "Pic 1" symbol 353 is mapped to a bottom symbol position, "10" symbol 352 is mapped to a middle symbol position, and "Pic 2" symbol 351 is mapped to a top symbol position.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

At step 460, the processor 460 determines whether symbols have been selected for all of the reel strips, and if not the processor reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions.

At step 545, processor 204 evaluates the symbols for winning combinations based on a pay table in memory 208 and an amount wagered per line. In an example, processor 204 evaluates the symbols from the leftmost column 1111 to the right most column 1115 to find uninterrupted sequences of three or more of the same symbol (or a wild symbol that can substitute for any symbol) along a pay line.

At step 550, processor 204 evaluates the symbols to determine whether they include a threshold number of configurable symbols, in this example, the threshold number is set at six. The configured threshold number can depend on factors such as the probability of the threshold number being selected and the relative return to player to be provided by the base game and the feature games. If the threshold number of configurable symbols is not met, the processor proceeds to step 590 and the game ends. When the processor 204 determines that the selected symbols include the threshold number of configurable symbols, processor 204 proceeds to step 555 and conducts the first feature game as will be described in more detail in relation to FIG. 6 below.

If when the processor 204 reaches step 530, the reel strips are configured with the second variant, the processor 204 proceeds down a second processing path starting with step 560 where processor 204 assigns prizes to the configurable symbols as described in relation to step 535 above. In this example, processor 204 assigns the prizes to using the same weighted prize tables. In other examples, there are different weighted tables for the first and second variants of the first reel strips.

At step 565, the processor 204 selects symbols for the plurality of columns of symbol display positions using the process described in relation to FIG. 4 above.

At step 570, the processor 204 evaluates the symbols for winning combinations as described in relation to step 545.

Figure 13:
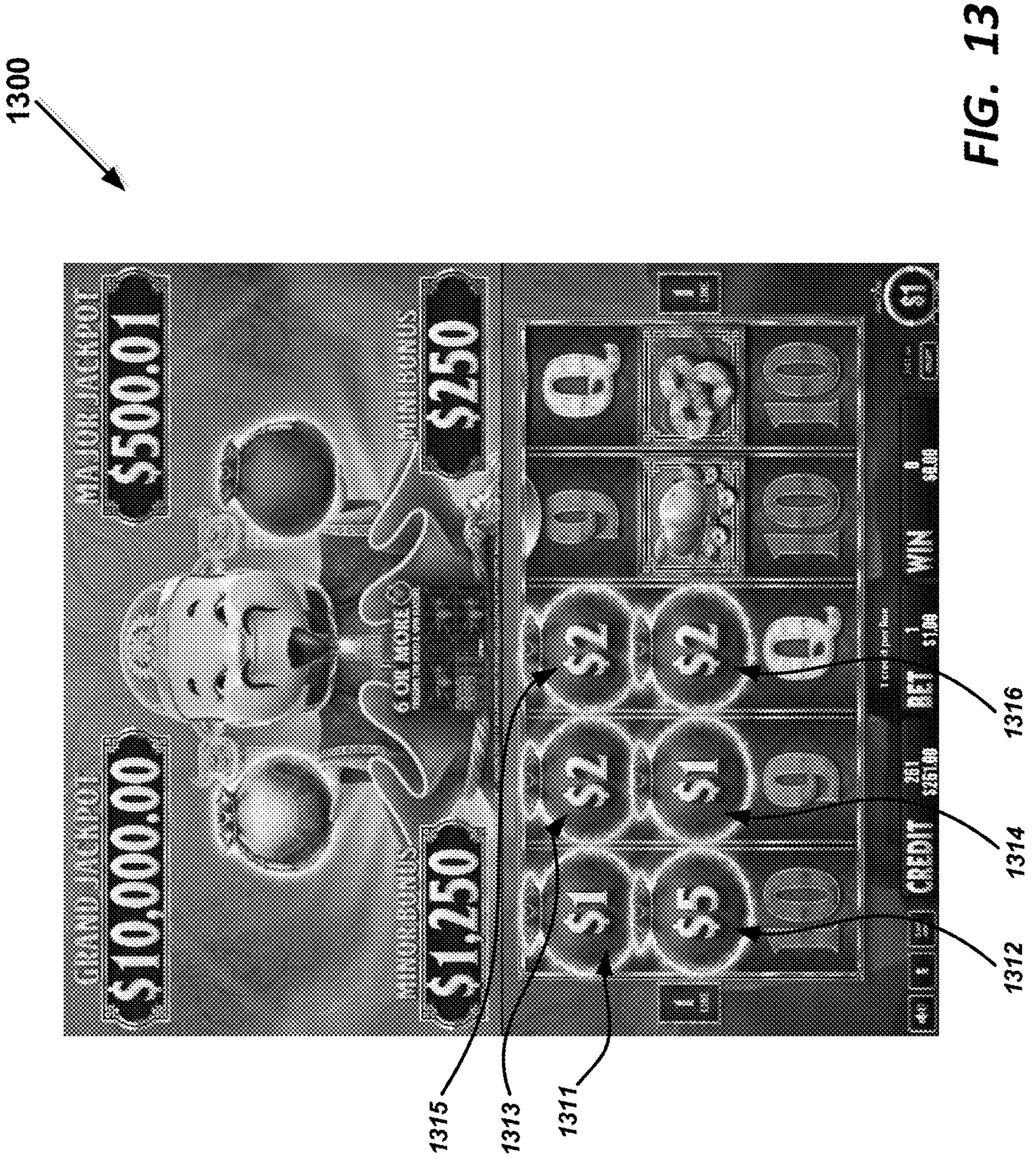

At step 575, the processor 204 determines evaluates the symbols to determine whether they include a threshold number of configurable symbols, in this example, the threshold number is set at six. If the threshold number of configurable symbols is not met, the processor proceeds to step 590 and the game ends. When the processor 204 determines that the selected symbols include the threshold number of configurable symbols, processor 204 proceeds to step 580 and conducts the first feature game. In this respect, FIG. 13 shows an example screen display 1300 of the threshold number of configurable symbols being met as there are six configurable symbols 1311-1316 in the screen display 1300.

Figure 7:
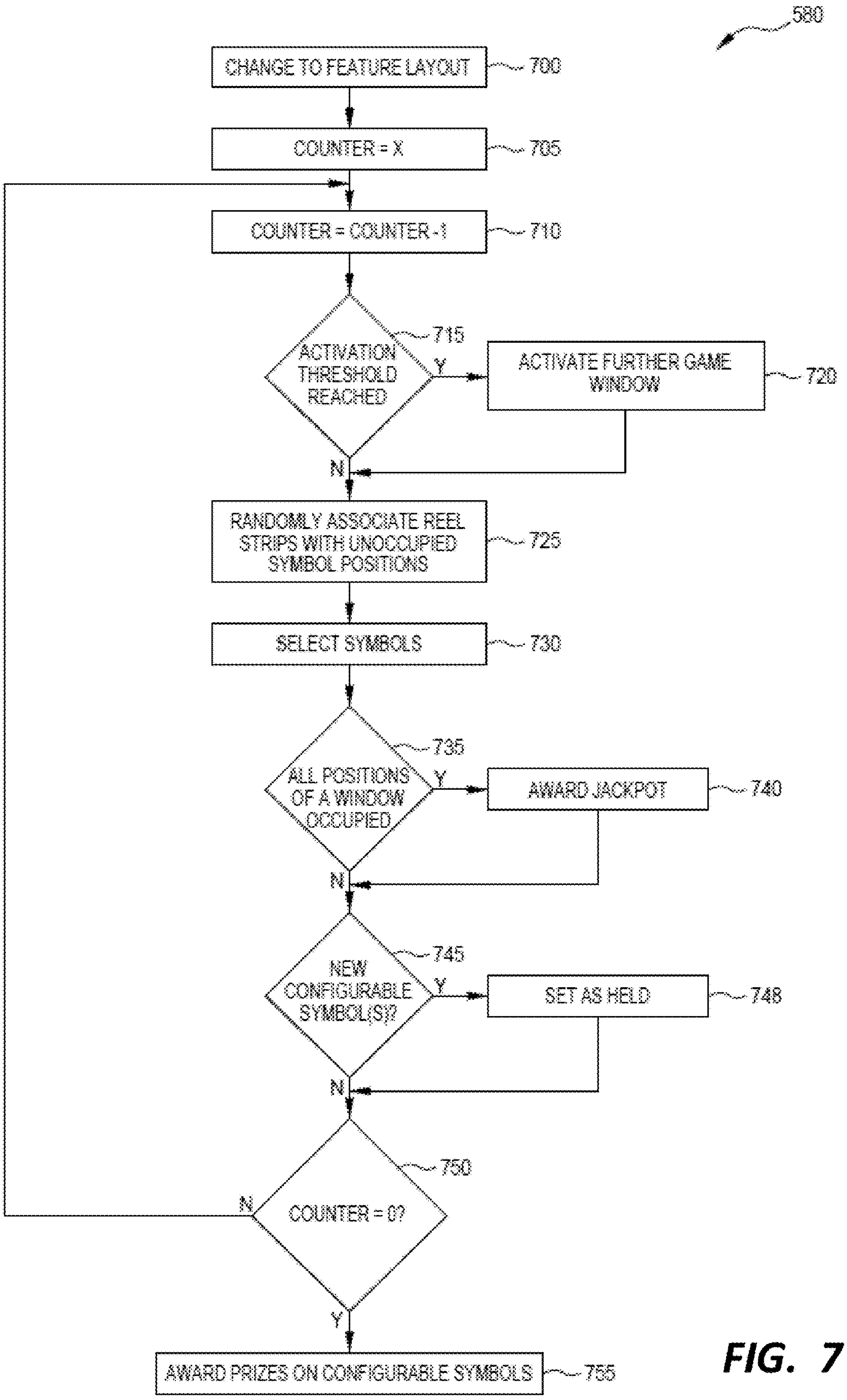
FIG. 7 is a flow chart of a method of operating a gaming device to conduct a second feature game.
Figure 14:
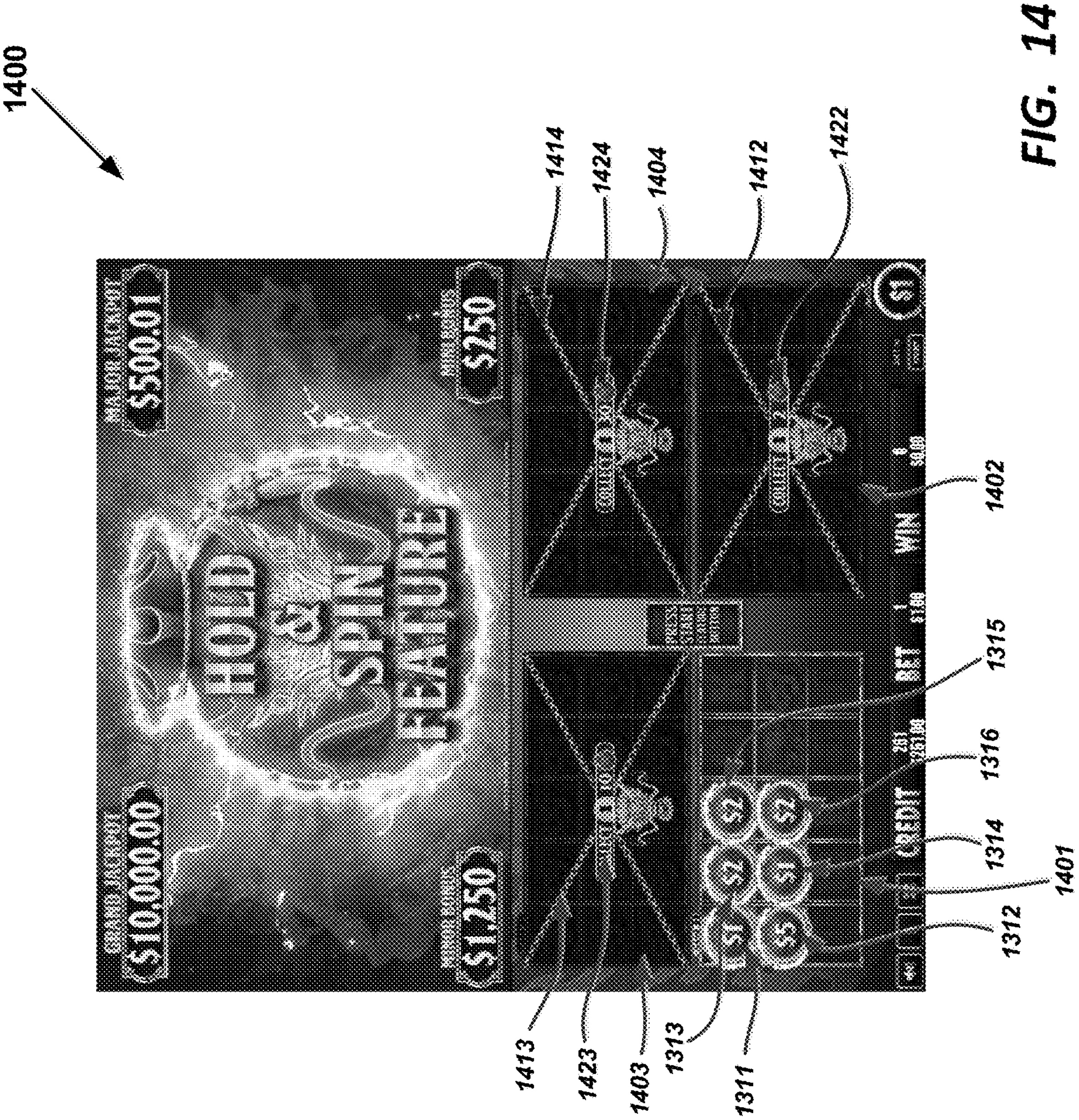

Detail of step 580 is shown in the flow chart 580 of FIG. 7. At step 700, the processor 204 controls the display to change from the base game layout shown in FIG. 13 to a feature game layout for the second feature game shown in the screen display 1400 of FIG. 14. Referring to FIG. 14 it will be observed that there are four game windows 1401-1404 and that only the first game window 1401 is active and has the configurable symbols 1311-1316 that resulted in triggering of the feature game held in place. In another example, the triggering configurable symbols may be displayed in defined symbol positions—that is have their positions rearranged between screen displays 1300 and 1400.

A cross in the form of chains 1412-1414 overlies each of second to fourth game windows to indicate that these windows are inactive. Unlock messages 1422-1424 state how many configurable symbols are required to activate each of the second to fourth game windows and include the symbolism of a lock to indicate that collecting the configurable symbols will unlock the game window. It will be observed that there are three different values of configurable symbols needed to unlock the game windows; that is there are activation conditions that need to be met for the processor 204 to make the game windows active. In this example, the activation conditions are collecting at least 8, 16 and 36 configurable symbols (including the triggering configurable symbols) by those configurable symbols being held in place. Thus, the unlock message 1422 that overlies the second game window states "Collect 2 [Red Bag Symbols]" because two more configurable symbols are required to reach the threshold of eight from the six configurable symbols displayed in FIG. 14.

At step 580, the processor sets a counter to an initial number of game instances (X). In this case, a minimum number of instances in which a symbol will be selected for each symbol positions not occupied by a held configurable symbol. In an example, the initial number of game instances, X is 3.

At step 710, the processor 204 decrements the counter by one.

At step 715, processor 204 determines whether an activation condition is met by an activation threshold being reached. In this example, if there are eight or more configurable symbols when the feature game is triggered, the feature game may be triggered with two active game windows. In some examples, this may be determined by processor 204 prior to changing the display to the feature layout so that two active windows are displayed. In other examples, the initial feature layout may show one game window followed by an animation of the second window activating prior to symbols being selected.

At step 725, the processor randomly associates reels strips with each unoccupied symbol position. Detail of process 725 (the same process as process 625 used in FIG. 6) is shown is FIG. 8.

At step 805, processor 204 initiates the selection process with W (a variable representing the number of active windows) set to 1. At step 810, the processor determines whether all symbol positions not occupied by a held configurable symbol have been associated with a reel strip of a set of second reel strips. For example, in the example screen display 1400 of FIG. 14 there are initially [nine unpopulated symbol positions because there were six configurable symbols when the second feature game was triggered.

In an example, there are two subsets of reel strips which have different relative probabilities of a configurable symbol being selected by processor 204. For example, in FIG. 10, first reel strip 1041 is of a type corresponding to a first subset of reel strips having a relatively lower probability of a configurable symbol being selected because there is only a single cash on reel symbol at reel strip position 301. Second reel strip 1042 has six cash on reel symbols and hence has a relatively higher probability of a configurable symbol being select. In an example, the first subset of reel strips may only include one reel strip of the first type but in other examples there may be more than one reel strip of the first type.

At step 820, processor 204 determines whether all reel strips of the first subset of reel strips have been assigned and if not proceeds to step 825 of randomly assigning a reel strip of a first subset to an unoccupied symbol position using one or more numbers obtained from RNG 212. In this respect, where there is more than one reel strip of a first type that has not been assigned, processor 204 maps a first random number to a reel strip and a second random number to an unoccupied reel strip position. It will thus be appreciated that when there is only one reel strip of the first type or only one unassigned reel strip only one random number is needed in order to select the position. Further, should the symbol position be the only unoccupied symbol position and there is only one reel strip of the first time, a random number is not needed to assign the reel strip of the first type.

At step 825, the processor 204 updates records of remaining symbol positions and reel strips in memory 208 so that they will not be used in a subsequent iteration.

The processor 204 will usually conduct a number of iterations in order to assign reel strips to each unoccupied symbol position of the initial active window. When processor 204 reaches step 820 and determines that all reel strips of a first subset have been assigned (which as explained above may be after a first iteration), processor 204 proceeds to step 835 and randomly assigns a reel strip of a second subset using one or more random numbers of the second subset of second reel strips. Similarly to the first subset of reel strips, where there is more than one symbol position that has not been assigned one of the second subset of reel strips, processor 204 maps a first random number to a reel strip of the second subset of reel strips and a second random number to an unoccupied reel strip position in order to assign a reel strip to a position. After step 835, processor 204 proceeds to step 830 and updates the records of remaining symbol positions and reel strips in memory 208.

Once all of the symbol positions have been assigned a reel strip, processor 204 proceeds from step 810 to step 840 and determines whether the current value of W equals the number of active reel strips and if it does the process ends at step 850 and processor 204 proceeds to step 735 in FIG. 7. If there are more active windows, processor 204 increments the value of W by one at step 845 and proceeds to step 810 to begin associating unoccupied symbol positions with reel strips. In one example, the same set of second reel strips is used for each game window. In one example, the set of second reel strips has one reel strip of the first type and fourteen reel strips of the second type. In other examples different sets of reel strips may be associated with each game window.

Figure 9:
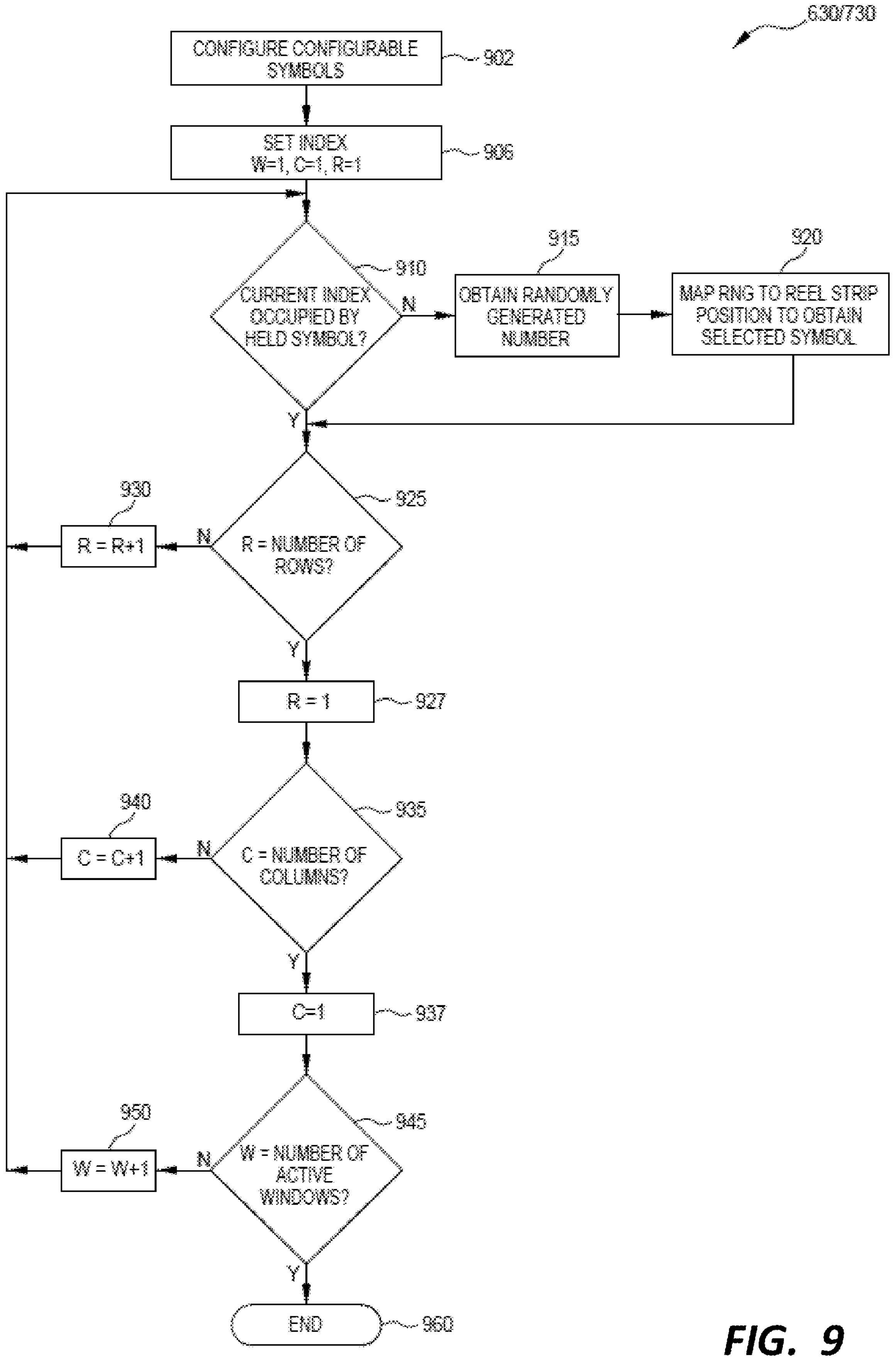
FIG. 9 is a flow chart of a symbol selection method.

At step 730, the processor 204 conducts a process to select symbols for each unoccupied symbol position as shown in FIG. 9. The process 730 is adapted relative to the process of FIG. 4 to account for 1. Individual reel strips being associated with individual symbol positions; and 2. Some symbol positions being occupied. In the example, process of FIG. 9, processor 204 begins at step 902 by configuring the configurable symbols of each reel strip that has been assigned to a symbol position using a technique such as that described above.

At step 906, the processor 204 sets an index defining the symbol position which the processor 204 will inspect first to determine whether it is occupied by a held configurable symbol. In this example, the index is set to W=1, C=1, R=1 to reflect the first active window (W), the first column (C) 1111, and the first row (R) 1121.

At step 910, the processor 204 determines whether symbol at index position W=1, C=1, R=1 is occupied by a held position and if not proceeds to step 915 and obtains an random number from RNG 212. At step 920, processor maps the random number to a reel strip position to thereby obtain a single selected symbol for the currently indexed symbol position. The processor then proceeds to step 925 and determines whether R equals the number of rows (in this case 3) and if not proceeds to step 930 and increments the value of R by 1. Thus, in this case, the processor 204 proceeds to step 910 with the indexed symbol position being W=1, C=1, R=2. As will be apparent from the above, if a symbol position is already occupied, processor 204 will proceed to step 925 and update the index. This may happen a number of times in a row. For example, referring to FIG. 14, for the first game window, the first and second rows of the first column are occupied by held symbols 1311, 1312 and accordingly, processor will increment the index to W=1, C=1, R=3 before selecting a symbol from the reel strip associated with this symbol position. In this example, processor 204 stores the assigned reel strips in a record that employs the index.

When R equals the number of rows, processor 204 proceeds from step 925 to step 927 and resets R to 1 before proceeding to step 935 and determining whether C equals the number of rows. Where it does not, processor 204 proceeds to step 940 and increments C by one so that the processor 204 enters step 910 with the index set as W=1, C=2, R=1. In this way, processor 204 proceeds to populating the second column of symbol positions 1112.

Once symbols have been selected for all columns of symbol positions, the processor 204 resets C=1 at step 937 and proceed step 945 and determines whether W equals the number of active window. If it does, the process ends at step 960. Otherwise the processor 204 proceeds to step 950 and increments W by one. Thus, the first time processor proceeds to step 950, the index will be set at W=2, C=1, R=1 after step 950.

After all the symbol have been selected at step 730, processor 204 controls the display to display the selected symbol accompanied by animations of the reel strips spinning to a stop. In an example, the processor 204 may stop the reel strips in a random order. In some examples, the processor 204 controls the display to display reel strips stopping in different game windows contemporaneously.

In other examples, processor 204 maintains a record of symbol positions and their associated reel strips and iterates through each entry in the record.

From the above it will be appreciated that as more game windows are activated at step 720, processor 204 selects symbols for more game windows but the number of unoccupied symbol positions for previously active game windows will tend to decrease.

At step 735 the processor 204 determines whether all the symbol positions of an active window are occupied by configurable symbols and if so, proceeds to step 740 and awards a jackpot prize. In this example, the value of grand jackpot 1131.

At step 745, the processor 204 determines whether any new configurable symbols were selected in this game instance and if so proceeds to step 748 and sets the respective symbol positions as held. In this example, each time a new configurable symbol is selected, the re-spin counter is reset to the initial value at step 705. Thus, even where there is not a new configurable symbol at step 745, the processor 204 will not determine at step 750 that the counter has reached zero until the processor has selected symbols for three consecutive game instances without selecting a configurable symbol.

It will be observed that as the processor selects more configurable symbols more windows will be activated.

Figure 15:
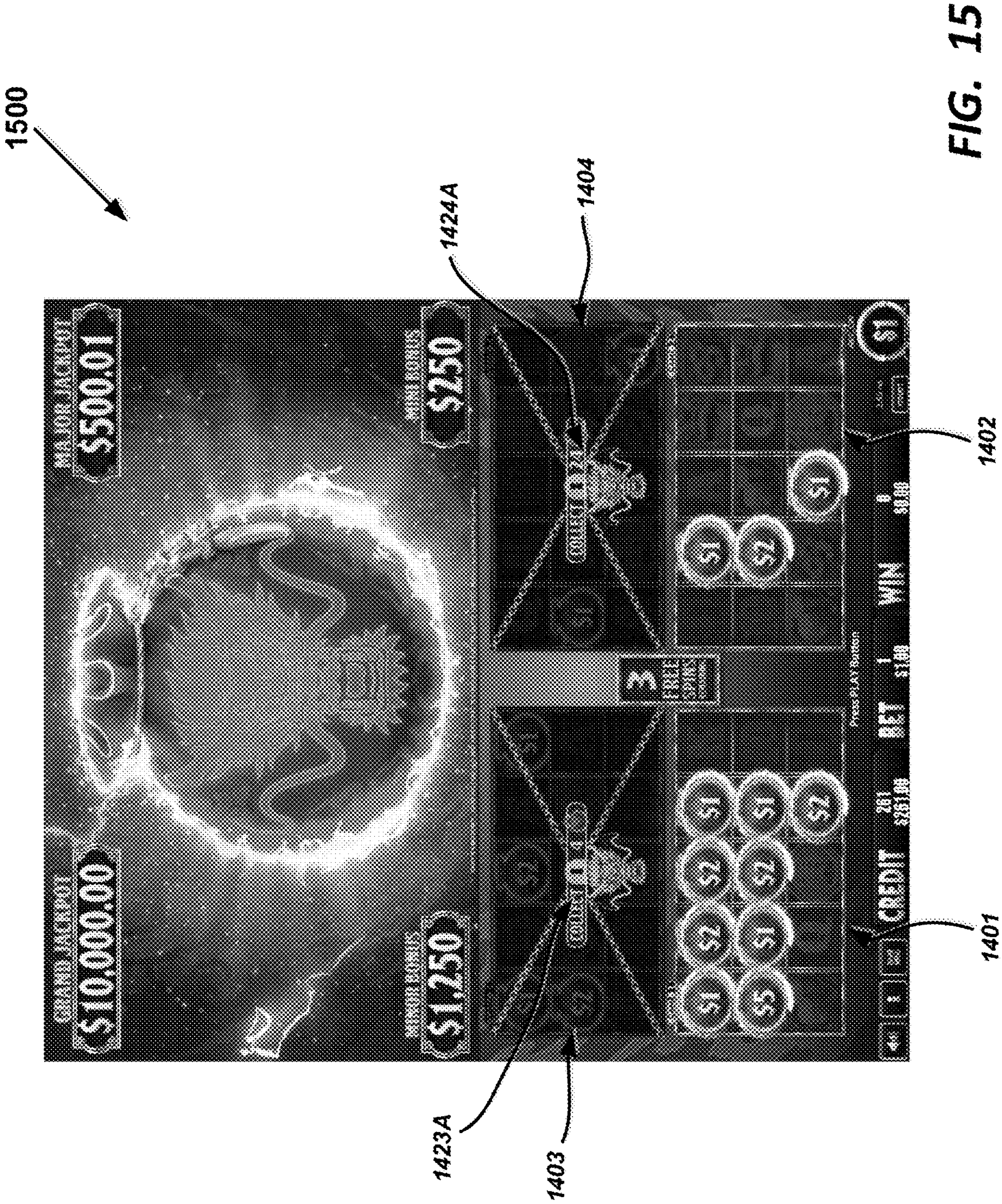
Figure 16:
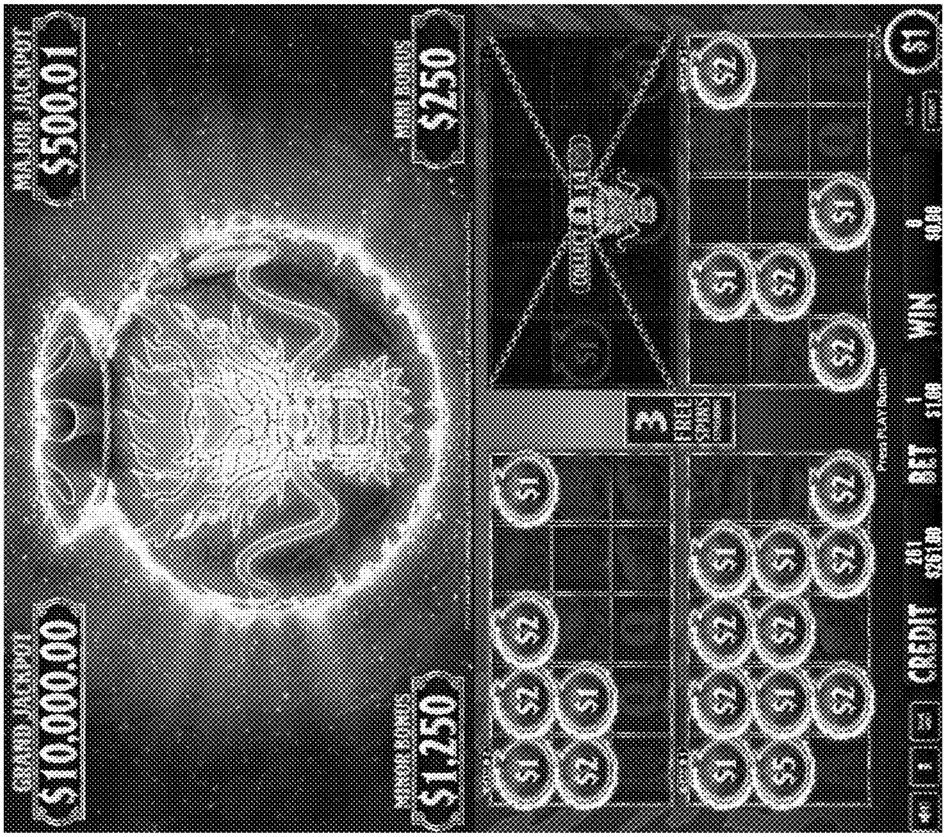

FIGS. 15 and 16 are example screen displays 1500, 1600 that show additional active game windows. For example, the screen display 1500 of FIG. 15 shows that first and second game windows 1401, 1402 are active. Nine configurable symbols are held in first game window 1401 and three configurable symbols are held in second game window for a total of twelve configurable symbols. Updated unlock messages 1423A, 1424A are displayed to reflect progress towards the thresholds required to unlock the third and fourth game window. For example, updated unlock message 1423A states "Collect 2 [Red Bag Symbols]" because two more configurable symbols are required to reach the threshold of sixteen symbols for unlocking the third game window 1403.

It will also be observed that due to the symbol selection mechanism described above, when a game window is newly activated there is a relatively higher chance of a new configurable symbol being selected than there is when the game window is almost completely populated by held configurable symbols.

Once the processor 204 determines at step 750 that the counter has reached zero, processor 204 performs a pay evaluation to determine what prizes should be awarded and awards all of the prizes on the configurable symbols. For example, if the counter reached zero with the arrangement of symbols shown in the screen display of FIG. 16, the processor 204 would award $38. In this respect, it will be observed that the player is guaranteed to be awarded at least the prize amounts on the triggering configurable symbols 1311-1316 (in this example $13).

Figure 6:
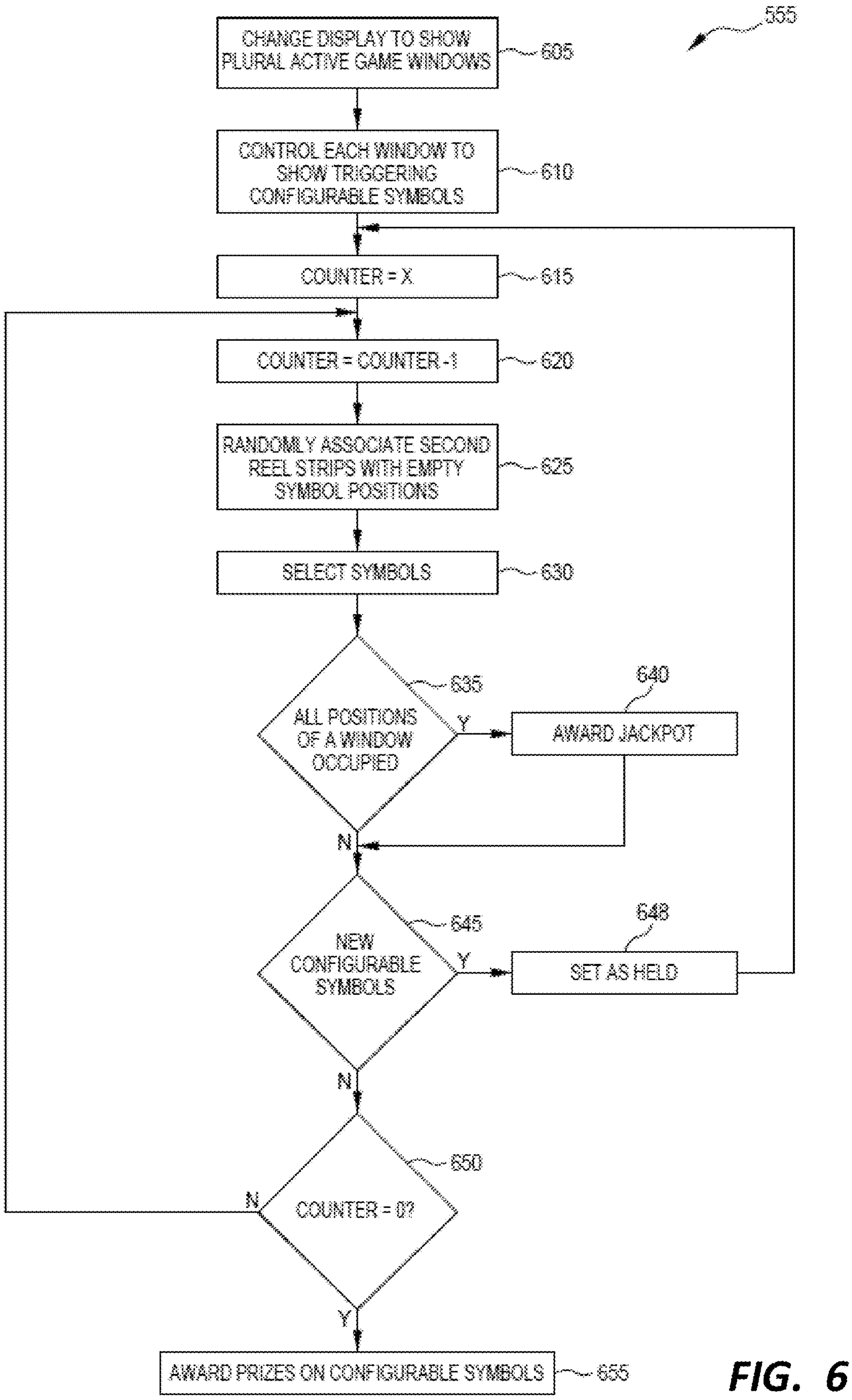
FIG. 6 is a flow chart of a method of operating a gaming device to conduct a first feature game.

Referring now to FIG. 6, it will be apparent that the method of operating the gaming device to implement the first feature game has a number of similarities to the method of operating the gaming device to implement the second feature game as well as some differences.

Figure 17:
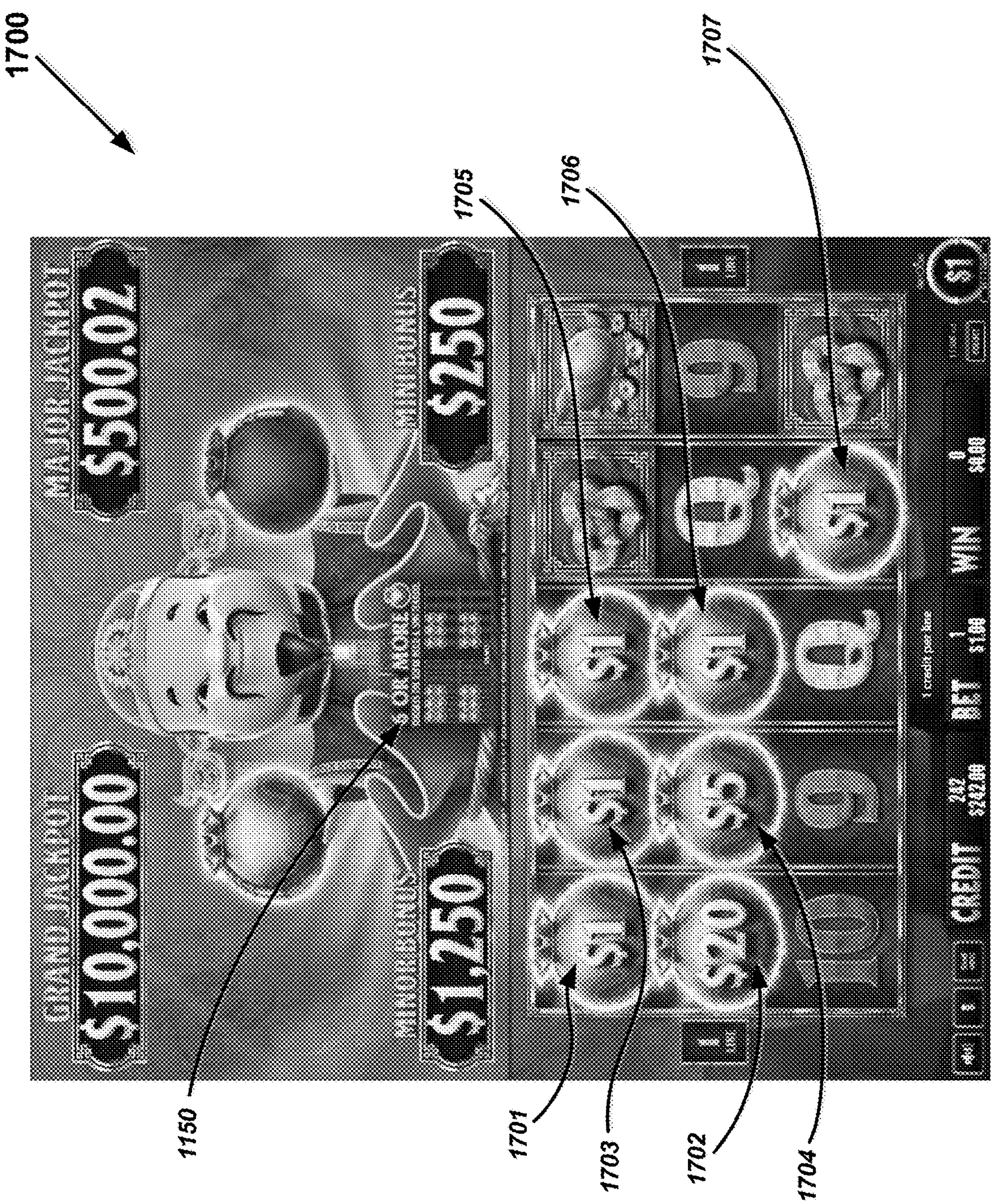
Figure 18:
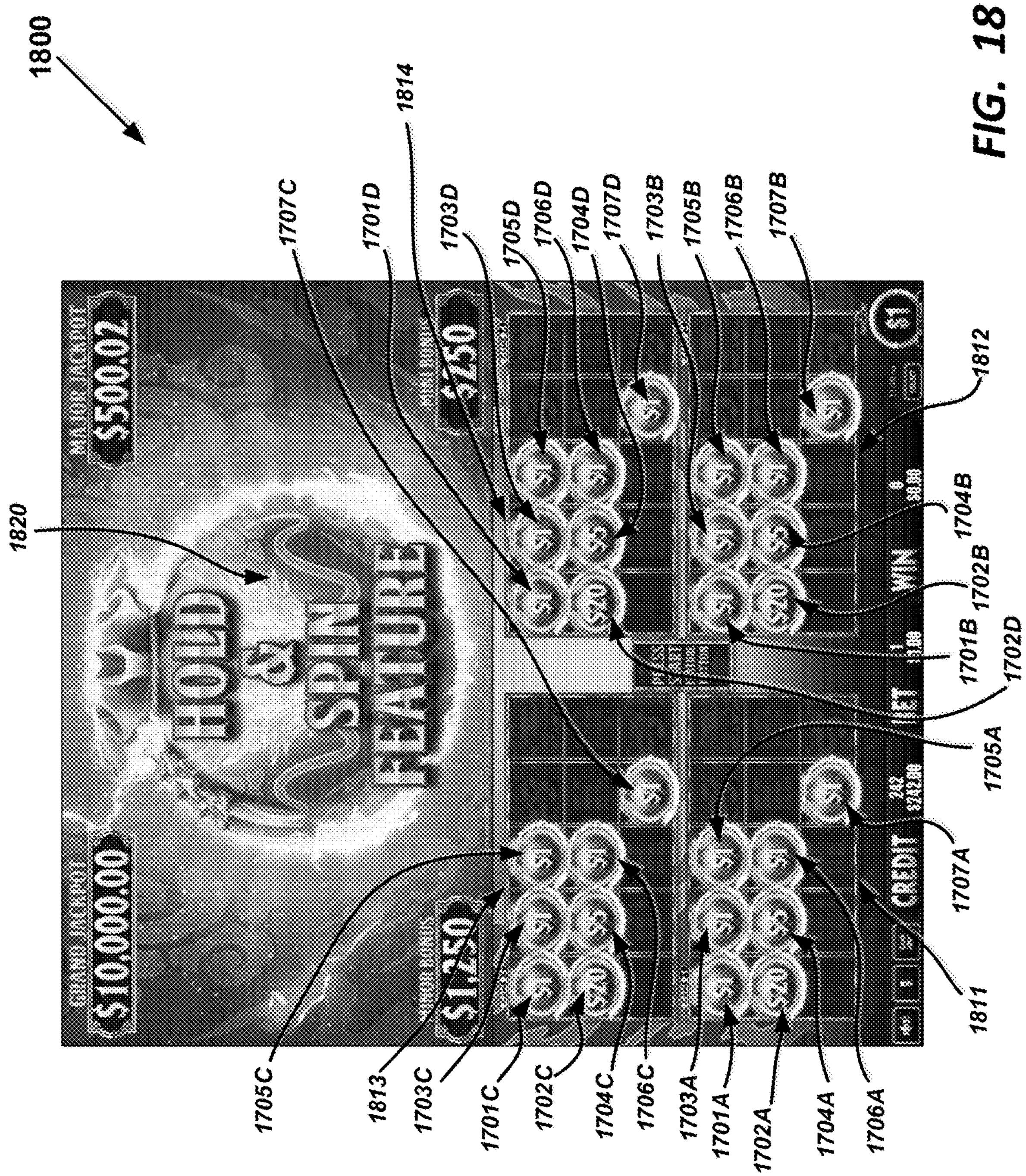

The main difference may be understood with reference to the example screen displays 1700, 1800 of FIGS. 17 and 18. FIG. 17 shows a triggering combination of seven configurable symbols 1701-1707. FIG. 18 shows that in the first feature game (the "gold bag" variant), upon the feature game being triggered all four game windows 1811-1814 are active and the triggering combination has been duplicated in each game window 1811-1814. That is there are four sets of configurable symbols: a first set 1701A-1707A in the first window 1811, a second set 1701B-1707B in the second window, a third set 1701C-1707C in the third window 1813, and a fourth set 1701D-1707D in the fourth game window 1814.

In this respect when conducting the first feature game at step 555, processor 204 begins by changing the display at step 605 to display a plurality of active windows (in this example, four windows). At step 610, the processor controls each window to show the triggering configurable symbols.

From step 615 onwards, the processor then proceeds in a similar manner to that described in relation to FIG. 7 but with the main differences that the player starts with more configurable symbols (and hence typically a larger guaranteed prize amount) but no further windows can be activated. Specifically at step 615, the processor 204 sets a counter to an initial value which in the example is three game instances. At step 620, the processor 204 decrements the counter by 1.

Figure 8:
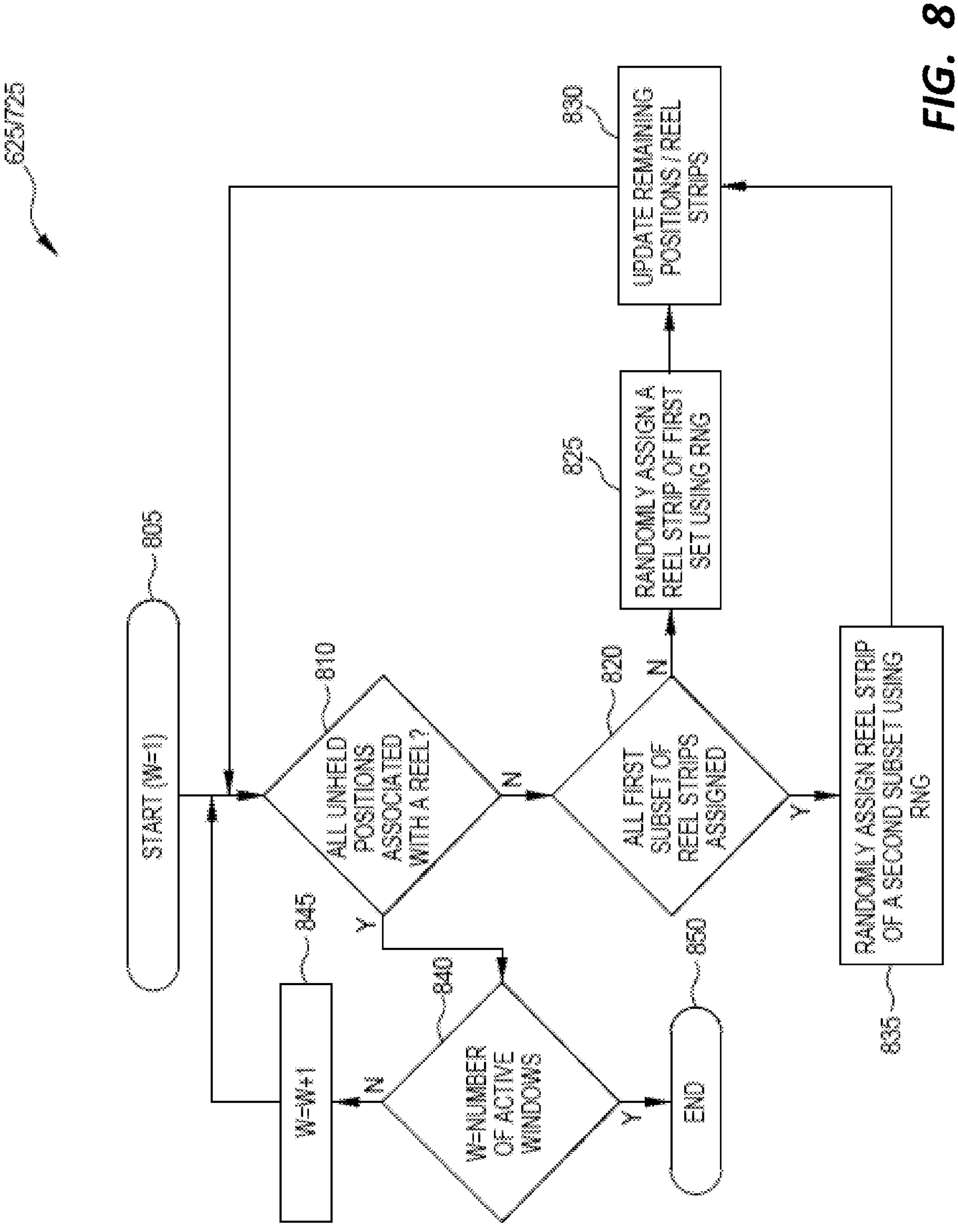
FIG. 8 is a flow chart of a reel strip selection method.

At step 625, the processor 204 randomly associates second reel strips to empty symbol positions using the process shown in FIG. 8. That is, in this example, step 625 and step 725 are the same. In other examples, the second reel strips may be different for the two feature games.

At step 630, the processor 204 selects symbols from the assigned second reel strips using the process shown in FIG. 9. That is, in this example, step 630 and step 730 are the same.

At step 635, the processor 204 determines whether all symbol positions of a game window are occupied by a configurable symbol following the selection step and if so proceeds to award a jackpot prize at step 640 which like step 740 is the grand jackpot prize 1131.

At step 645, the processor 204 determines whether the selected symbols included at least one new configurable symbol and if so proceeds to step 648 of setting the symbol as held before reverting the step 615 and resetting the counter to the initial value (here 3 game instances). That is, as with second feature game, the processor will only determine at step 650 that the counter has reached zero when no new configurable symbol is selected for three consecutive symbol selections.

At step 655, the processor 204 performs a pay evaluation to determine the prizes to be awarded and awards the total of the prizes shown on the configurable symbols.

It will be apparent that the two feature games described above use a common trigger mechanism but that the different appearance of the configurable symbols as well as messages 1150, 1250 communicate the differences to the player such that the player expects feature game play at steps 555, 580 which is related but different.

Other example embodiments may use fewer or more game windows than the examples described above.

Figure 19:
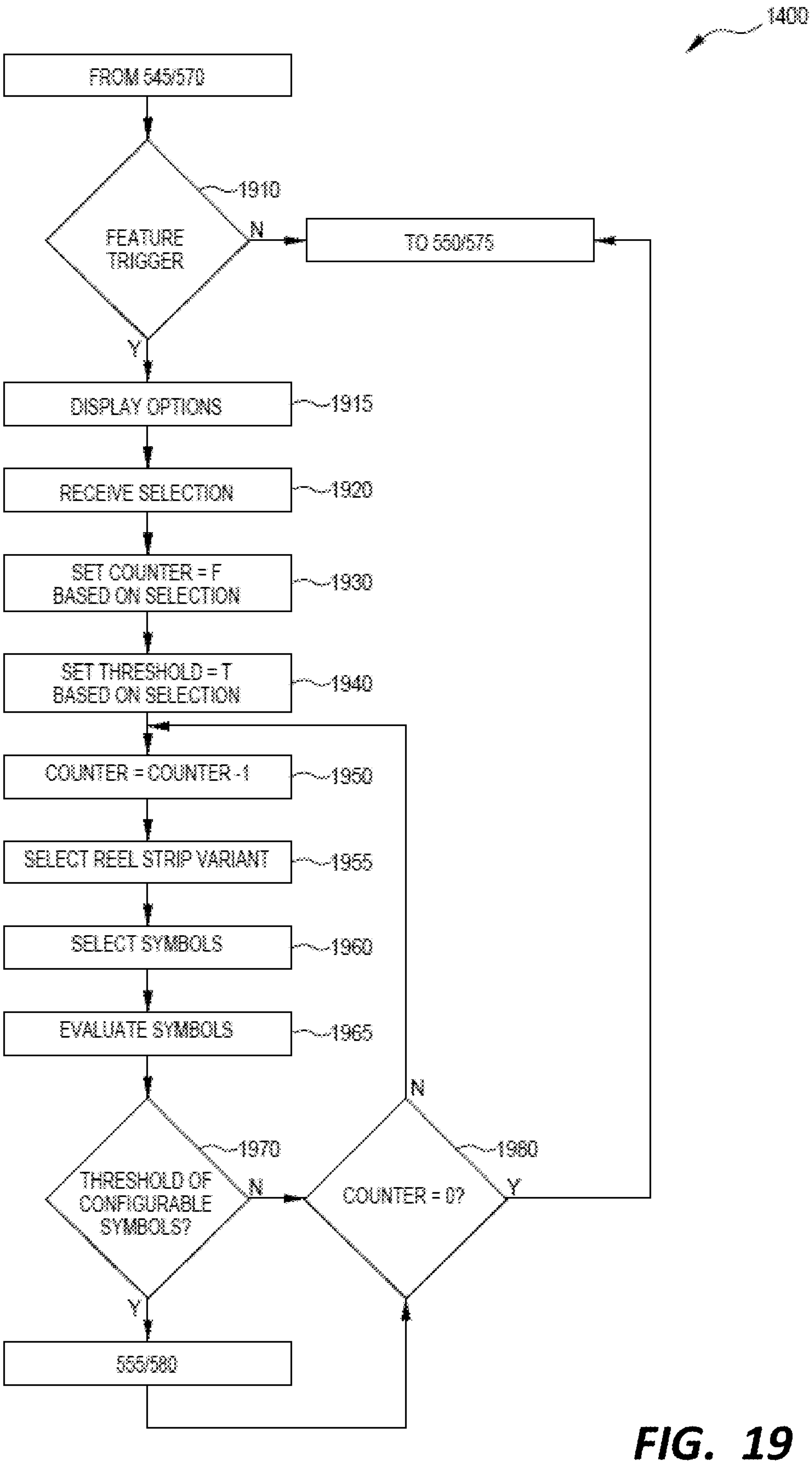
FIG. 19 is a flow chart of a method of operating a gaming device.

FIG. 19 shows a method 1900 of operating gaming device 200 to incorporate an additional free games feature game from which the feature games described above may be triggered. In this example, free games feature game is triggerable irrespective of which variant of the first reel strips are used. In an example, the trigger condition for the free games feature is the occurrence of three or more "Scat" symbols when symbols are selected at step 540 or step 565 and the process 1900 is conducted after the selected symbols are evaluated at step 545 or step 570.

Figure 20:
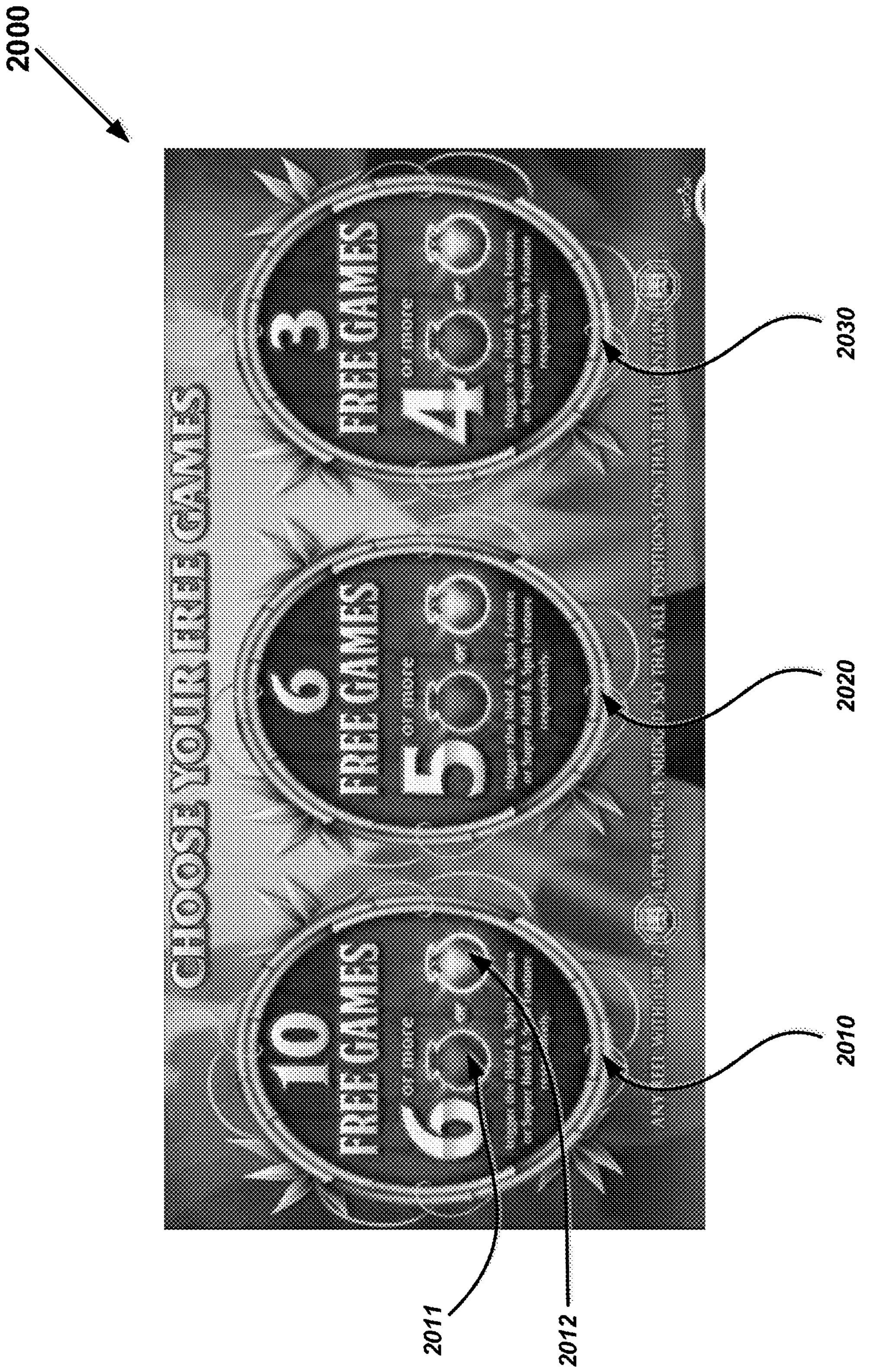
FIG. 20 is an example screen display.

At step 1910, processor 204 determines whether the free games feature trigger is met. At step 1915, the processor 204 controls the display to display a plurality of selectable options 2010, 2020, 2030 to the player as shown in the example screen display 2000 of FIG. 20.

On the feature selection screen 2000, the player is presented with the following options:

- Option 1 (2010)—10 free games. 6 configurable symbols of either the first variant 2011 or the second variant 2012 will trigger the Hold and Spin Feature (i.e. either feature 1 or feature 2).
- Option 2 (2020)—6 free games. 5 configurable symbols will trigger the Hold and Spin Feature.
- Option 3 (2030)—3 free games. 4 configurable symbols will trigger the Hold and Spin Feature.

While in this example, the hold and spin game is conducted with different variants of the reel strips, in other examples, there may be a single set of reel strips with only one type of configurable symbol when configurable symbols are implemented in combination with the selectable options described above.

Further, in another example, the options are provided in connection with an embodiment where there is only ever a single active game window—i.e. the additional feature game is conducted in a single game window.

At step 1920, the processor 1920 receives a player selection of one of the options.

In an example, some symbols such as all royal symbols are removed for the duration of the free games feature to provide modified first reel strips. However as described above, there are two variants of the modified reel strips, and like the process described at step 520, the processor 204 selects a variant of first reel strips to be used for each free game at step 1955.

At step 1930, the processor 204 sets a counter to the number of free games in the selected option and at step 1940, the processor 204 sets the threshold based on the selection.

At step 1955, the processor 204 decrements the counter by one and at step 1955 the processor randomly selects which variant of the modified reel strips are employed.

At step 1960, the processor 204 selects symbol for the columns of symbol positions using the process described in relation to FIG. 4 above. This process being the same as that conducted at steps 545 or 570.

At step 1965, processor 204 evaluates the symbols at step 1965 using the process described in relation to steps 545 and 570 above.

At step 1970, processor 204 determines whether the selected symbols include the number of configurable symbols set at step 1940 and if not checks whether all the free games have been conducted at step 1980. If all the free games have not been conducted, the processor 204 re-enters the loop at step 1950.

Where the threshold is met at step 1970, the processor proceeds to conduct the relevant one of the feature games described in connection with steps 555 and 580 (see FIGS. 6 and 7) before checking whether the counter has reached zero at step 1980. When the counter reaches zero at step 1980, processor 204 proceeds to the relevant one of steps 550 and 575 noting that the reel strip layout is generally arranged so that the free games feature will not trigger when the re-spin feature triggers by locating the "Scat" symbols away from the configurable symbols.

The following non-limiting, numbered examples are provided to further describe selected embodiments of the disclosed subject matter.

Example 1 is a gaming device comprising: a display; a processor; and a memory storing (i) a first set of reel strips, each reel strip of the first set of reel strips comprising configurable symbols and non-configurable symbols, (ii) a second set of reel strips each comprising non-configurable symbols and at least one configurable symbol, and (iii) instructions which, when executed by the processor, cause the processor to: assign, in each game instance, a prize to at least each configurable symbol selected for display; conduct a base game instance by: controlling the display to display a first game window comprising a plurality of columns of symbol positions, wherein each reel strip of the first set of reel strips corresponds to a respective one of the plurality of columns of symbol positions, selecting a plurality of symbols from each of the first set of reel strips, controlling the display to display the selected symbols in the plurality of columns of symbol positions, evaluating the selected symbols for winning combinations, and evaluating the selected symbols to determine whether a feature trigger condition is met, wherein the feature trigger condition comprises selection of a defined minimum number of configurable symbols among the selected symbols; initiate, responsive to the feature trigger condition being met, a plurality of feature game instances, wherein when the plurality of feature game instances are initiated, at least the first game window is active and the configurable symbols that met the feature trigger condition are held in their respective positions from the base game instance in the first game window; and conduct each feature game instance by: determining whether an activation condition is met, responsive to an activation condition being met, activating another game window comprising another plurality of columns of symbol positions; selecting a symbol for each symbol position of each active window not occupied by a held configurable symbol from a reel strip of the plurality of second reel strips assigned to the respective symbol position, and holding any configurable symbols in place for each subsequent feature game instance; and award, at the conclusion of the feature game instances, at least a total of the prizes assigned to configurable symbols in each active game window.

In Example 2, the subject matter of Example 1 optionally includes that a first activation condition comprises reaching a first threshold number of configurable symbols in an active game window.

In Example 3, the subject matter of Example 2 optionally includes that a second activation condition comprises reaching a second threshold number of configurable symbols in an active game window.

In Example 4, the subject matter of Example 3 optionally includes that a third activation condition comprises reaching a third threshold number of configurable symbols in an active game window.

In Example 5, the subject matter of any one or more of Examples 2-4 optionally include wherein upon the first activation condition being met when the plurality of feature game instances are initiated, a second game window is active for a first feature game instance.

In Example 6, the subject matter of any one or more of Examples 1-5 optionally include wherein when the instructions are executed by the processor, they cause the processor to award a Jackpot prize if all symbol positions of an active window are filled by configurable symbols.

In Example 7, the subject matter of any one or more of Examples 1-6 optionally include wherein when the instructions are executed by the processor, they cause the processor to set the number of feature game instances to an initial number and to reset the number of feature game instances to the initial number if one or more additional configurable symbols are selected for an active game window.

In Example 8, the subject matter of Example 7 optionally includes that the initial number is three game instances.

In Example 9, the subject matter of any one or more of Examples 1-8 optionally include wherein when the instructions are executed by the processor, they cause the processor to assign reel strips of the plurality of second reel strips to the respective symbol positions using a random process.

In Example 10, the subject matter of Example 9 optionally includes that the random process includes assigning at least one reel strip from a first subset of the second reel strips to a respective symbol position of each active window, and assigning reel strips from a second subset of the second reel strips to any remaining symbol positions of each active window, wherein the first subset of second reel strips are configured to have a lower probability of a configurable symbol being selected by the processor than the second subset of second reel strips.

Example 11 is a method of operating a gaming device comprising a display and a memory storing (i) a first set of reel strips, each reel strip of the first set of reel strips comprising configurable symbols and non-configurable symbols, and (ii) a second set of reel strips each comprising non-configurable symbols and at least one configurable symbol, the method comprising: assigning, in each game instance, a prize to at least each configurable symbol selected for display; conducting a base game instance by: controlling the display to display a first game window comprising a plurality of columns of symbol positions, wherein each reel strip of the first set of reel strips corresponds to a respective one of the plurality of columns of symbol positions, selecting a plurality of symbols from each of the first set of reel strips, controlling the display to display the selected symbols in the plurality of columns of symbol positions, evaluating the selected symbols for winning combinations, and evaluating the selected symbols to determine whether a feature trigger condition is met, wherein the feature trigger condition comprises selection of a defined minimum number of configurable symbols among the selected symbols; initiating, responsive to the feature trigger condition being met, a plurality of feature game instances, wherein when the plurality of feature game instances are initiated, at least the first game window is active and the configurable symbols that met the feature trigger condition are held in their respective positions from the base game instance in the first game window; and conducting each feature game instance by: determining whether an activation condition is met, responsive to an activation condition being met, activating another game window comprising another plurality of columns of symbol positions for each subsequent feature game instance selecting a symbol for each symbol position of each active window not occupied by a held configurable symbol from a reel strip of the plurality of second reel strips assigned to the respective symbol position, and holding any configurable symbols in place for each subsequent feature game instance; and awarding, at the conclusion of the feature game instances, at least a total of the prizes assigned to configurable symbols in each active game window.

In Example 12, the subject matter of Example 11 optionally includes that a first activation condition comprises reaching a first threshold number of configurable symbols in an active game window.

In Example 13, the subject matter of Example 12 optionally includes that a second activation condition comprises reaching a second threshold number of configurable symbols in an active game window.

In Example 14, the subject matter of Example 13 optionally includes that a third activation condition comprises reaching a third threshold number of configurable symbols in an active game window.

In Example 15, the subject matter of any one or more of Examples 12-14 optionally include activating a second game window is active for a first feature game instance upon the first activation condition being met when the plurality of feature game instances are initiated.

In Example 16, the subject matter of any one or more of Examples 11-15 optionally include awarding a Jackpot prize if all symbol positions of an active window are filled by configurable symbols.

In Example 17, the subject matter of any one or more of Examples 11-16 optionally include setting the number of feature game instances to an initial number and resetting the number of feature game instances to the initial number if one or more additional configurable symbols are selected for an active game window.

In Example 18, the subject matter of any one or more of Examples 11-17 optionally include assigning reel strips of the plurality of second reel strips to the respective symbol positions using a random process.

In Example 19, the subject matter of Example 18 optionally includes assigning at least one reel strip from a first subset of the second reel strips to a respective symbol position of each active window, and assigning reel strips from a second subset of the second reel strips to any remaining symbol positions of each active window, wherein the first subset of second reel strips are configured to have a lower probability of a configurable symbol being selected by the processor than the second subset of second reel strips.

Example 20 is a system comprising: one or more processors; and at least one memory storing (i) a first set of reel strips, each reel strip of the first set of reel strips comprising configurable symbols and non-configurable symbols, (ii) a second set of reel strips each comprising non-configurable symbols and at least one configurable symbol, and (iii) instructions which, when executed by the one or more processor, cause the one or more processors to: assign, in each game instance, a prize to at least each configurable symbol selected for display; conduct a base game instance by: controlling a display to display a first game window comprising a plurality of columns of symbol positions, wherein each reel strip of the first set of reel strips corresponds to a respective one of the plurality of columns of symbol positions, selecting a plurality of symbols from each of the first set of reel strips, controlling the display to display the selected symbols in the plurality of columns of symbol positions, evaluating the selected symbols for winning combinations, and evaluating the selected symbols to determine whether a feature trigger condition is met, wherein the feature trigger condition comprises selection of a defined minimum number of configurable symbols among the selected symbols; initiate, responsive to the feature trigger condition being met, a plurality of feature game instances, wherein when the plurality of feature game instances are initiated, at least the first game window is active and the configurable symbols that met the feature trigger condition are held in their respective positions from the base game instance in the first game window; and conduct each feature game instance by: determining whether an activation condition is met, responsive to an activation condition being met, activating another game window comprising another plurality of columns of symbol positions, selecting a symbol for each symbol position of each active window not occupied by a held configurable symbol from a reel strip of the plurality of second reel strips assigned to the respective symbol position, and holding any configurable symbols in place for each subsequent feature game instance, award, at the conclusion of the feature game instances, at least a total of the prizes assigned to configurable symbols in each active game window.

Example 21 is a gaming device comprising: a display; a processor; and a memory storing (i) a first set of reel strips, each reel strip of the first set of reel strips comprising configurable symbols and non-configurable symbols, (ii) a second set of reel strips each comprising non-configurable symbols and at least one configurable symbol, and (iii) instructions which, when executed by the processor, cause the processor to: assign, in each game instance, a prize to at least each configurable symbol selected for display; conduct a base game instance by: controlling the display to display a first game window comprising a plurality of columns of symbol positions, wherein each reel strip of the first set of reel strips corresponds to a respective one of the plurality of columns of symbol positions, selecting a plurality of symbols from each of the first set of reel strips, controlling the display to display the selected symbols in the plurality of columns of symbol positions, evaluating the selected symbols for winning combinations, and evaluating the selected symbols to determine whether a feature trigger condition is met, wherein the feature trigger condition comprises selection of a defined minimum number of configurable symbols among the selected symbols; initiate, responsive to the feature trigger condition being met, a plurality of feature game instances, wherein when the plurality of feature game instances are initiated, a plurality of game windows are active and the configurable symbols that met the feature trigger condition in respect of the first game window are displayed in each active game window at symbol positions corresponding to the symbol positions at which the triggering configurable symbols were displayed in the base game instance; and conduct each feature game instance by: selecting a symbol, for each symbol position of each active window not occupied by a held configurable symbol, from a reel strip of the plurality of second reel strips assigned to the respective symbol position, holding any configurable symbols in place for each subsequent feature game instance; and award, at the conclusion of the feature game instances, at least a total of the prizes assigned to configurable symbols in each active game window.

In Example 22, the subject matter of Example 21 optionally includes that when the instructions are executed by the processor, they cause the processor to award a Jackpot prize if all symbol positions of an active window are filled by configurable symbols.

In Example 23, the subject matter of any one or more of Examples 21-22 optionally include wherein when the instructions are executed by the processor, they cause the processor to set the number of feature game instances to an initial number and to reset the number of feature game instances to the initial number if one or more additional configurable symbols are selected.

In Example 24, the subject matter of Example 23 optionally includes that the initial number is three game instances.

In Example 25, the subject matter of any one or more of Examples 21-24 optionally include wherein when the instructions are executed by the processor, they cause the processor to assign reel strips of the plurality of second reel strips to the respective symbol positions using a random process.

In Example 26, the subject matter of Example 25 optionally includes that the random process includes assigning at least one reel strip from a first subset of the second reel strips to a respective symbol position of each active window, and assigning reel strips from a second subset of the second reel strips to any remaining symbol positions of each active window, wherein the first subset of second reel strips are configured to have a lower probability of a configurable symbol being selected by the processor than the second subset of second reel strips.

In Example 27, the subject matter of any one or more of Examples 1-26 optionally include wherein there are four active game windows.

In Example 28, the subject matter of any one or more of Examples 21-27 optionally include wherein when the instructions are executed by the processor, they cause the processor to, prior to the conducting the base game instance, configure the first reel strips by selecting between a first variant of the first reel strips which results in the feature game being initiated with the plurality of active game windows and a second variant of the first reel strips which results in the initiation of an alternative feature game.

In Example 29, the subject matter of Example 28 optionally includes that when the instructions are executed by the processor, they cause the processor to, in the alternative feature game: initiate, responsive to the feature trigger condition being met, a plurality of feature game instances, wherein when the plurality of feature game instances are initiated, the first game window is active and the configurable symbols that met the feature trigger condition are held in their respective positions from the base game instance; conduct each feature game instance by: determining whether an activation condition is met responsive to an activation condition being met, activating another game window comprising another plurality of columns of symbol positions; selecting a symbol for each symbol position of each active window not occupied by a held configurable symbol from a reel strip of the plurality of second reel strips assigned to the respective symbol position, and holding any configurable symbols in place for each subsequent feature game instance; and award, at the conclusion of the feature game instances, at least a total of the prizes assigned to configurable symbols in each active game window.

Example 30 is a method of operating a gaming device comprising a display, and a memory storing (i) a first set of reel strips, each reel strip of the first set of reel strips comprising configurable symbols and non-configurable symbols, and (ii) a second set of reel strips each comprising non-configurable symbols and at least one configurable symbol, the method comprising: assigning, in each game instance, a prize to at least each configurable symbol selected for display; conducting a base game instance by: controlling the display to display a first game window comprising a plurality of columns of symbol positions, wherein each reel strip of the first set of reel strips corresponds to a respective one of the plurality of columns of symbol positions, selecting a plurality of symbols from each of the first set of reel strips, controlling the display to display the selected symbols in the plurality of columns of symbol positions, evaluating the selected symbols for winning combinations, and evaluating the selected symbols to determine whether a feature trigger condition is met, wherein the feature trigger condition comprises selection of a defined minimum number of configurable symbols among the selected symbols; initiating, responsive to the feature trigger condition being met, a plurality of feature game instances, wherein when the plurality of feature game instances are initiated, a plurality of game windows are active and the configurable symbols that met the feature trigger condition in respect of the first game window are displayed in each active game window at symbol positions corresponding to the symbol positions at which the triggering configurable symbols were displayed in the base game instance; and conducting each feature game instance by: selecting a symbol, for each symbol position of each active window not occupied by a held configurable symbol, from a reel strip of the plurality of second reel strips assigned to the respective symbol position, and holding any configurable symbols in place for each subsequent feature game instance; and awarding, at the conclusion of the feature game instances, at least a total of the prizes assigned to configurable symbols in each active game window.

In Example 31, the subject matter of Example 30 optionally includes awarding a Jackpot prize if all symbol positions of an active window are filled by configurable symbols.

In Example 32, the subject matter of any one or more of Examples 30-31 optionally include wherein when the instructions are executed by the processor, they cause the processor to setting the number of feature game instances to an initial number and resetting the number of feature game instances to the initial number if one or more additional configurable symbols are selected.

In Example 33, the subject matter of Example 32 optionally includes that the initial number is three game instances.

In Example 34, the subject matter of any one or more of Examples 30-33 optionally include assigning reel strips of the plurality of second reel strips to the respective symbol positions using a random process.

In Example 35, the subject matter of Example 34 optionally includes that the random process includes assigning at least one reel strip from a first subset of the second reel strips to a respective symbol position of each active window, and assigning reel strips from a second subset of the second reel strips to any remaining symbol positions of each active window, wherein the first subset of second reel strips are configured to have a lower probability of a configurable symbol being selected by the processor than the second subset of second reel strips.

In Example 36, the subject matter of any one or more of Examples 30-35 optionally include wherein there are four active game windows.

In Example 37, the subject matter of any one or more of Examples 30-36 optionally include prior to the conducting the base game instance, configuring the first reel strips by selecting between a first variant of the first reel strips which results in the feature game being initiated with the plurality of active game windows and a second variant of the first reel strips which results in the initiation of an alternative feature game.

In Example 38, the subject matter of Example 37 optionally includes in the alternative feature game: initiating, responsive to the feature trigger condition being met, a plurality of feature game instances, wherein when the plurality of feature game instances are initiated, the first game window is active and the configurable symbols that met the feature trigger condition are held in their respective positions from the base game instance; conducting each feature game instance by: determining whether an activation condition is met, responsive to an activation condition being met, activating another game window comprising another plurality of columns of symbol positions, selecting a symbol for each symbol position of each active window not occupied by a held configurable symbol from a reel strip of the plurality of second reel strips assigned to the respective symbol position, and holding any configurable symbols in place for each subsequent feature game instance; and awarding, at the conclusion of the feature game instances, at least a total of the prizes assigned to configurable symbols in each active game window.

Example 39 is a system comprising: one or more processors; and at least one memory storing (i) a first set of reel strips, each reel strip of the first set of reel strips comprising configurable symbols and non-configurable symbols, (ii) a second set of reel strips each comprising non-configurable symbols and at least one configurable symbol, and (iii) instructions which, when executed by the one or more processors, cause the one or more processors to: assign, in each game instance, a prize to at least each configurable symbol selected for display; conduct a base game instance by: controlling a display to display a first game window comprising a plurality of columns of symbol positions, wherein each reel strip of the first set of reel strips corresponds to a respective one of the plurality of columns of symbol positions, selecting a plurality of symbols from each of the first set of reel strips, controlling the display to display the selected symbols in the plurality of columns of symbol positions, evaluating the selected symbols for winning combinations, and evaluating the selected symbols to determine whether a feature trigger condition is met, wherein the feature trigger condition comprises selection of a defined minimum number of configurable symbols among the selected symbols; initiate, responsive to the feature trigger condition being met, a plurality of feature game instances, wherein when the plurality of feature game instances are initiated, a plurality of game windows are active and the configurable symbols that met the feature trigger condition in respect of the first game window are displayed in each active game window at symbol positions corresponding to the symbol positions at which the triggering configurable symbols were displayed in the base game instance; and conduct each feature game instance by: selecting a symbol, for each symbol position of each active window not occupied by a held configurable symbol, from a reel strip of the plurality of second reel strips assigned to the respective symbol position, and holding any configurable symbols in place for each subsequent feature game instance; and award, at the conclusion of the feature game instances, at least a total of the prizes assigned to configurable symbols in each active game window.

Example 40 is one or more non-transitory media including software stored thereon, the software including instructions for controlling one or more devices to perform a method, the method comprising: retaining in the non-transitory media (i) a first set of reel strips, each reel strip of the first set of reel strips comprising configurable symbols and non-configurable symbols, and (ii) a second set of reel strips each comprising non-configurable symbols and at least one configurable symbol, the method comprising: assigning, in each game instance, a prize to at least each configurable symbol selected for display; conducting a base game instance by: controlling the display to display a first game window comprising a plurality of columns of symbol positions, wherein each reel strip of the first set of reel strips corresponds to a respective one of the plurality of columns of symbol positions, selecting a plurality of symbols from each of the first set of reel strips, initiating control of a display to display the selected symbols in the plurality of columns of symbol positions, evaluating the selected symbols for winning combinations, and evaluating the selected symbols to determine whether a feature trigger condition is met, wherein the feature trigger condition comprises selection of a defined minimum number of configurable symbols among the selected symbols; initiating, responsive to the feature trigger condition being met, a plurality of feature game instances, wherein when the plurality of feature game instances are initiated, a plurality of game windows are active and the configurable symbols that met the feature trigger condition in respect of the first game window are displayed in each active game window at symbol positions corresponding to the symbol positions at which the triggering configurable symbols were displayed in the base game instance; and conducting each feature game instance by: selecting a symbol, for each symbol position of each active window not occupied by a held configurable symbol, from a reel strip of the plurality of second reel strips assigned to the respective symbol position, and holding any configurable symbols in place for each subsequent feature game instance; and awarding, at the conclusion of the feature game instances, at least a total of the prizes assigned to configurable symbols in each active game window.

In Example 41, the subject matter of Example 40 optionally includes that when the instructions are executed by the processor, they cause the processor to setting the number of feature game instances to an initial number and resetting the number of feature game instances to the initial number if one or more additional configurable symbols are selected.

In Example 42, the subject matter of any one or more of Examples 40 and 41 optionally include prior to the conducting the base game instance, configuring the first reel strips by selecting between a first variant of the first reel strips which results in the feature game being initiated with the plurality of active game windows and a second variant of the first reel strips which results in the initiation of an alternative feature game.

In Example 43, the subject matter of any one or more of Examples 40-43 optionally include in the alternative feature game: initiating, responsive to the feature trigger condition being met, a plurality of feature game instances, wherein when the plurality of feature game instances are initiated, the first game window is active and the configurable symbols that met the feature trigger condition are held in their respective positions from the base game instance; conducting each feature game instance by: determining whether an activation condition is met, responsive to an activation condition being met, activating another game window comprising another plurality of columns of symbol positions, selecting a symbol for each symbol position of each active window not occupied by a held configurable symbol from a reel strip of the plurality of second reel strips assigned to the respective symbol position, and holding any configurable symbols in place for each subsequent feature game instance; and awarding, at the conclusion of the feature game instances, at least a total of the prizes assigned to configurable symbols in each active game window.

Example 44 is a gaming device comprising: a display; a processor; and a memory storing (i) a first set of reel strips, each reel strip of the first set of reel strips comprising configurable symbols and non-configurable symbols, (ii) a second set of reel strips each comprising non-configurable symbols and at least one configurable symbol, and (iii) instructions which, when executed by the processor, cause the processor to: assign, in each game instance, a prize to at least each configurable symbol selected for display; initiate a plurality of feature game instances responsive to a feature trigger condition being met in a base game instance, wherein the feature trigger condition comprises selection of a defined minimum of configurable symbols, wherein the configurable symbols that met the feature trigger condition are held in their respective positions from the base game instance in a first game window; and conduct at least one feature game instance by: determining whether a first activation condition is met, wherein the first activation condition comprises reaching a first threshold number of configurable symbols in an active game window, responsive to the first activation condition being met, activating another game window comprising a plurality of columns of symbol positions; selecting a symbol for each symbol position of each active window not occupied by a held configurable symbol from a reel strip of the plurality of second reel strips assigned to the respective symbol position, and holding any configurable symbols in place for each subsequent feature game instance; and perform a pay evaluation at the conclusion of the feature game instances based on the prizes assigned to configurable symbols in each active game window.

In Example 45, the subject matter of Example 44 optionally includes wherein when executed by the processor, the instructions cause the processor to: conduct a base game instance by: controlling the display to display the first game window comprising a plurality of columns of symbol positions, wherein each reel strip of the first set of reel strips corresponds to a respective one of the plurality of columns of symbol positions of the first game window, randomly selecting, based on an outcome of a random number generator, a plurality of selected symbols from each of the first set of reel strips, controlling the display to display the selected symbols in the plurality of columns of symbol positions, evaluating the selected symbols for winning combinations, and evaluating the selected symbols to determine whether a feature trigger condition is met, wherein the feature trigger condition comprises selection of the defined minimum number of configurable symbols among the selected symbols.

In Example 46, the subject matter of any one or more of Examples 44-45 optionally include wherein conducting at least one feature game instance incudes: determining whether a second activation condition is met, wherein the second activation condition comprises reaching a second threshold number of configurable symbols in an active game window; and responsive to the second activation condition being met, activating another game window comprising another plurality of columns of symbol positions.

In Example 47, the subject matter of Example 46 optionally includes wherein conducting at least one feature game instance includes: determining whether a third activation condition is met, wherein the third activation condition comprises reaching a third threshold number of configurable symbols in an active game window; and responsive to the third activation condition being met, activating another game window comprising another plurality of columns of symbol positions.

In Example 48, the subject matter of any one or more of Examples 44-47 optionally include wherein conducting at least one feature game instance includes: activating a second game window for a first feature game instance responsive to the first activation condition being met when the plurality of feature game instances are initiated.

In Example 49, the subject matter of any one or more of Examples 44-48 optionally include wherein when executed by the processor, the instructions cause the processor to: prior to conducting the base game instance, selecting between a first variant of the first reel strips which results in the feature game being initiated with the first game window active, and a second variant of the first reel strips which results in the feature game being initiated with a plurality of active game windows.

In Example 50, the subject matter of any one or more of Examples 44-49 optionally include wherein when executed by the processor, the instructions cause the processor to set the number of feature game instances to an initial number and to reset the number of feature game instances to the initial number if one or more additional configurable symbols are selected for an active game window.

In Example 51, the subject matter of Example 50 optionally includes wherein the initial number is three game instances.

In Example 52, the subject matter of any one or more of Examples 44-51 optionally include wherein when executed by the processor, the instructions cause the processor to: assign reel strips of the plurality of second reel strips to the respective symbol positions using a random process.

In Example 53, the subject matter of Example 52 optionally includes wherein the random process includes: randomly assigning, using a random number generator, at least one reel strip from a first subset of the second reel strips to a respective symbol position of each active window, and randomly assigning, using a random number generator, reel strips from a second subset of the second reel strips to any remaining symbol positions of each active window, wherein the first subset of second reel strips are configured to have a lower probability of a configurable symbol being selected by the processor than the second subset of second reel strips.

Example 54 is a method of operating a gaming device comprising a display and a memory storing (i) a first set of reel strips, each reel strip of the first set of reel strips comprising configurable symbols and non-configurable symbols, and (ii) a second set of reel strips each comprising non-configurable symbols and at least one configurable symbol, the method comprising: assigning a prize to at least each configurable symbol selected for display for each game instance; initiating, based on a feature trigger condition being met, a plurality of feature game instances, wherein the feature trigger condition is a defined minimum of configurable symbols selected in a first game window of a base game instance, wherein when the plurality of feature game instances are initiated, at least the first game window is active and the configurable symbols that met the feature trigger condition are held in the same positions in the first game window; and conducting one or more feature game instances by: determining whether an activation condition is met, wherein the activation condition comprises reaching a threshold number of configurable symbols in an active game window, activating an additional game window based on the activation condition being met, wherein the additional game window comprises a plurality of columns of symbol positions for one or more subsequent feature game instances, randomly selecting, using a random number generator, a symbol for each symbol position of each active window not occupied by a held configurable symbol, wherein the symbol for each symbol position is selected from a reel strip of the plurality of second reel strips assigned to the respective symbol position, and holding configurable symbols in place for each subsequent feature game instance; and generating a game outcome for the plurality of feature game instances based on at least the prizes assigned to configurable symbols selected for display in each active game window.

In Example 55, the subject matter of Example 54 optionally includes wherein a first activation condition comprises reaching a first threshold number of configurable symbols in an active game window, and a second activation condition comprises reaching a second threshold number of configurable symbols in an active game window.

In Example 56, the subject matter of Example 55 optionally includes activating a second game window for a first feature game instance upon the first activation condition being met when the plurality of feature game instances are initiated.

In Example 57, the subject matter of any one or more of Examples 54-56 optionally include conducting a base game instance by: controlling the display to display the first game window comprising a plurality of columns of symbol positions, wherein each reel strip of the first set of reel strips corresponds to a respective one of the plurality of columns of symbol positions of the first game window, randomly selecting, using a random number generator, a plurality of symbols from each of the first set of reel strips, controlling the display to display the selected symbols in the plurality of columns of symbol positions, evaluating the selected symbols for winning combinations, and evaluating the selected symbols to determine whether the feature trigger condition is met, wherein the feature trigger condition comprises selection of the defined minimum number of configurable symbols among the selected symbols.

In Example 58, the subject matter of any one or more of Examples 54-57 optionally include assigning reel strips of the plurality of second reel strips to the respective symbol positions using a random process.

In Example 59, the subject matter of Example 58 optionally includes randomly assigning, using a random number generator, at least one reel strip from a first subset of the second reel strips to a respective symbol position of each active window, and randomly assigning, using a random number generator, reel strips from a second subset of the second reel strips to any remaining symbol positions of each active window, wherein the first subset of second reel strips are configured to have a lower probability of a configurable symbol being selected by the processor than the second subset of second reel strips.

Example 60 is non-transitory computer-readable medium, readable by at least one processor and comprising instructions stored thereon to cause the at least one processor to access (i) a first set of reel strips, each reel strip of the first set of reel strips comprising configurable symbols and non-configurable symbols, and (ii) a second set of reel strips each comprising non-configurable symbols and at least one configurable symbol, assign a prize to at least each configurable symbol selected for display in each game instance; determine that a rigger condition is met in a base game instance, wherein the trigger condition comprises selection of a predefined minimum of configurable symbols in a first game window; initiating a plurality of game instances, wherein when the plurality of game instances are initiated, a plurality of game windows are active and the configurable symbols that met the trigger condition in the first game window are displayed in each active game window at symbol positions corresponding to the symbol positions at which the triggering configurable symbols were displayed in the base game instance; and conduct at least one subsequent game instance by: randomly selecting a symbol, using a random number generator, for each symbol position of each active window not occupied by a held configurable symbol, wherein each symbol is selected from a reel strip of the plurality of second reel strips assigned to the respective symbol position, and holding any configurable symbols in place for each subsequent game instance, and perform a pay evaluation based on prizes assigned to configurable symbols in each active game window.

In Example 61, the subject matter of Example 60 optionally includes wherein the trigger condition is a feature trigger condition and the plurality of game instances triggered by the feature trigger condition are a plurality of feature game instances, and the instructions cause the at least one processor to set the number of feature game instances to an initial number and resetting the number of feature game instances to the initial number if one or more additional configurable symbols are selected.

In Example 62, the subject matter of any one or more of Examples 60-61 optionally include wherein the trigger condition is a feature trigger condition that triggers a feature game, and the instructions cause the at least one processor to, prior to conducting the base game instance, configure the first reel strips by selecting between a first variant of the first reel strips which results in the feature game being initiated with the plurality of active game windows and a second variant of the first reel strips which results in the initiation of an alternative feature game.

In Example 63, the subject matter of Example 62 optionally includes wherein the instructions cause the at least one processor to initiate, responsive to the feature trigger condition being met in the base game instance using the second variant of the first reel strips, a plurality of feature game instances, wherein when the plurality of feature game instances are initiated, the first game window is active and the configurable symbols that met the feature trigger condition are held in their respective positions from the base game instance, conduct at least one feature game instance by: determining whether an activation condition is met, responsive to an activation condition being met, activating another game window comprising another plurality of columns of symbol positions, selecting a symbol for each symbol position of each active window not occupied by a held configurable symbol from a reel strip of the plurality of second reel strips assigned to the respective symbol position, and holding any configurable symbols in place for each subsequent feature game instance, and perform a pay evaluation at the conclusion of the feature game instances based on the prizes assigned to configurable symbols in each active game window.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A non-transitory computer-readable medium, readable by at least one processor and comprising instructions stored thereon to cause the at least one processor to:

invoking a random number generator to obtain a first random number;

performing a lookup operation against a plurality of values each associated with one of a plurality of base game reel strips stored in a reel strip data structure to select a first variant of the base game reel strip from the plurality of base game reel strips, triggering a first number of active feature game windows of the first variant of the base game reel strip in response to a feature game trigger, wherein a second variant of the base game reel strip is configured to trigger a second number of active feature game windows in response to the feature game trigger, and generating a first set of symbols from the first variant of the base game reel strip; and in response to the first set of symbols satisfying the feature game trigger:

initiating the first number of active game windows, wherein each of the first number of active game windows are populated with one or more configurable symbols from the first set of symbols, generating a second set of symbols from a set of feature reel strips in a second reel strip data structure, wherein the second set of reel strips comprises non-configurable symbols and at least one configurable symbol, and populating empty symbol positions in each of the first number of active game windows with the second set of symbols.

2. The non-transitory computer-readable medium of claim 1, further comprising instructions stored thereon to cause the at least one processor to:

activate a first active game window of the first number of active game windows in response to the first set of symbols satisfying the feature game trigger.

3. The non-transitory computer-readable medium of claim 2, wherein the first active game window is activated from a base game instance.

4. The non-transitory computer-readable medium of claim 1, wherein prior to activation, a second active game window of the first number of active game windows is an inactive window, and wherein the first active game window and the inactive window are presented concurrently on a display device.

5. The non-transitory computer-readable medium of claim 4, further comprising instructions stored thereon to cause the at least one processor to, upon activating the second active game window:

hold any configurable symbols in symbol positions in the first active game window for corresponding symbol positions the second active game window.

6. The non-transitory computer-readable medium of claim 5, further comprising instructions stored thereon to cause the at least one processor to:

apply the set of symbols for the second active game window to positions of the second active game window not occupied by a held configurable symbol.

7. A method implemented by at least one processor in communication with at least one memory, the method comprising:

invoking a random number generator to obtain a first random number;

performing a lookup operation against a plurality of values each associated with one of a plurality of base game reel strips stored in a reel strip data structure to select a first variant of the base game reel strip from the plurality of base game reel strips, triggering a first number of active feature game windows of the first variant of the base game reel strip in response to a feature game trigger, and wherein a second variant of the base game reel strip is configured to trigger a second number of active feature game windows in response to the feature game trigger, and generating a first set of symbols from the first variant of the base game reel strip; and in response to the first set of symbols satisfying the feature game trigger:

initiating the first number of active game windows, wherein each of the first number of active game windows are populated with one or more configurable symbols from the first set of symbols, generating a second set of symbols from a set of feature reel strips in a second reel strip data structure, wherein the second set of reel strips comprises non-configurable symbols and at least one configurable symbol, and populating empty symbol positions in each of the first number of active game windows with the second set of symbols.

8. The method of claim 7, further comprising:

activating the first active game window of the first number of active game windows in response to the first set of symbols satisfying the feature game trigger.

9. The method of claim 8, wherein the first active game window is activated from a base game instance.

10. The method of claim 7, wherein prior to activation, a second active game window of the first number of active game windows is an inactive window, and wherein the first active game window and the inactive window are presented concurrently on a display device.

11. The method of claim 10, further comprising, upon activating the second active game window:

holding any configurable symbols in symbol positions in the first active game window for corresponding symbol positions the second active game window.

12. The method of claim 11, further comprising:

applying the set of symbols for the second active game window to positions of the second active game window not occupied by a held configurable symbol.

13. A gaming device comprising:

a processor; and a memory storing (i) a first reel strip data structure, (ii) a second reel strip data structure, and (iii) instructions which, when executed by the processor, cause the processor to:

invoking a random number generator to obtain a first random number;

performing a lookup operation against a plurality of values each associated with one of a plurality of base game reel strips stored in a reel strip data structure to select a first variant of the base game reel strip i-s-selected from the plurality of base game reel strips, triggering a first number of active feature game windows of the first variant of the base game reel strip in response to a feature game trigger, and wherein a second variant of the base game reel strip is configured to trigger a second number of active feature game windows in response to the feature game trigger, and generating a first set of symbols from the first variant of the base game reel strip; and in response to the first set of symbols satisfying the feature game trigger:

initiating the first number of active game windows, wherein each of the first number of active game windows are populated with one or more configurable symbols from the first set of symbols, generating a second set of symbols from a set of feature reel strips in a second reel strip data structure, wherein the second set of reel strips comprises non-configurable symbols and at least one configurable symbol, and populating empty symbol positions in each of the first number of active game windows with the second set of symbols.

14. The gaming device of claim 13, further comprising instructions which, when executed by the processor, cause the processor to:

activate a first active game window of the first number of active game windows in response to the first set of symbols satisfying the feature game trigger.

15. The gaming device of claim 14, wherein the first active game window is activated from a base game instance.

16. The gaming device of claim 13, further comprising:

a display device, wherein prior to activation, a second active game window of the first number of active game windows is an inactive window, and wherein the first active game window and the inactive window are presented concurrently on the display device.

17. The gaming device of claim 16, if further comprising instructions which, when executed by the processor, cause the processor to, upon activating the second active game window:

hold any configurable symbols in symbol positions in the first active game window for corresponding symbol positions the second active game window.

18. The gaming device of claim 17, further comprising instructions which, when executed by the processor, cause the processor to:

apply the set of symbols for the second active game window to positions of the second active game window not occupied by a held configurable symbol.

* * * * *